(12) United States Patent
Winton et al.

(10) Patent No.: US 11,958,345 B2
(45) Date of Patent: Apr. 16, 2024

(54) AUGMENTED MEDIA EXPERIENCE IN A VEHICLE CABIN

(71) Applicant: HARMAN INTERNATIONAL INDUSTRIES, INCORPORATED, Stamford, CT (US)

(72) Inventors: Riley Winton, Opelika, AL (US); Gorm Jorgensen, Struer (DK); Christopher Ludwig, Bloomfield Hills, MI (US); Christopher Trestain, Livonia, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/894,982

(22) Filed: Aug. 24, 2022

(65) Prior Publication Data

US 2022/0402428 A1 Dec. 22, 2022

Related U.S. Application Data

(62) Division of application No. 16/240,495, filed on Jan. 4, 2019, now Pat. No. 11,453,333.

(Continued)

(51) Int. Cl.
*B60J 7/00* (2006.01)
*B60J 7/043* (2006.01)
(Continued)

(52) U.S. Cl.
CPC .............. *B60J 7/0007* (2013.01); *B60J 7/043* (2013.01); *B60Q 3/208* (2017.02); *B60Q 3/51* (2017.02);
(Continued)

(58) Field of Classification Search
CPC ... B60Q 3/208; B60Q 3/51; B60Q 3/70; B60J 7/0007; B60J 7/043; B60R 1/00; B60R 11/0235; B60R 2011/0028
(Continued)

(56) References Cited

U.S. PATENT DOCUMENTS 8,029,052 B2 * 10/2011 Kadzban ................ B62D 25/06
296/210
10,086,762 B2 * 10/2018 Uhm ................... B60R 11/0235
(Continued)

FOREIGN PATENT DOCUMENTS

CN 102467668 A 5/2012
DE 20 2005 014791 U1 12/2005
(Continued)

*Primary Examiner* — Zhen Y Wu
(74) *Attorney, Agent, or Firm* — Artegis Law Group, LLP

(57) ABSTRACT

Techniques for an augmented media experience in a vehicle cable include a first display surface positioned on a ceiling of the vehicle cabin, a second display surface positioned on the ceiling of the vehicle cabin, a memory storing a media application and a processor coupled to the memory. The first display surface is movable relative to the second display surface. The processor, when executing the media application performs the steps of deploying the first display surface to a deployed position where the first display surface is positioned between a first glass panel in a ceiling of the vehicle cabin and an interior of the vehicle cabin and displaying media content in the vehicle cabin using the first display surface and the second display surface.

20 Claims, 14 Drawing Sheets

Related U.S. Application Data

(60) Provisional application No. 62/613,709, filed on Jan. 4, 2018.

(51) Int. Cl.

| | | |
|---|---|---|
| *B60Q 3/208* | (2017.01) | |
| *B60Q 3/51* | (2017.01) | |
| *B60Q 3/70* | (2017.01) | |
| *B60R 1/00* | (2022.01) | |
| *B60R 11/02* | (2006.01) | |
| *B60R 11/00* | (2006.01) | |

(52) U.S. Cl.
CPC .................. *B60Q 3/70* (2017.02); *B60R 1/00* (2013.01); *B60R 11/0235* (2013.01); *B60R 2011/0028* (2013.01)

(58) Field of Classification Search
USPC ........................................................ 340/438
See application file for complete search history.

(56) References Cited

U.S. PATENT DOCUMENTS

| | | | | |
|---|---|---|---|---|
| 10,583,738 | B2* | 3/2020 | Gassman | B60R 11/0235 |
| 2003/0111871 | A1* | 6/2003 | De Gaillard | B60J 7/1642 |
| | | | | 296/216.01 |
| 2006/0113881 | A1* | 6/2006 | Donovan | B60R 11/0235 |
| | | | | 348/794 |
| 2007/0180979 | A1* | 8/2007 | Rosenberg | G02B 27/017 |
| | | | | 84/611 |
| 2011/0181496 | A1* | 7/2011 | Lanier | H04N 21/4751 |
| | | | | 345/2.2 |
| 2012/0274562 | A1* | 11/2012 | Ps | G06V 40/16 |
| | | | | 345/158 |
| 2013/0235351 | A1* | 9/2013 | Sachdev | B60R 1/00 |
| | | | | 353/13 |
| 2014/0245358 | A1* | 8/2014 | Kumar | H04N 21/4788 |
| | | | | 725/61 |
| 2015/0078632 | A1* | 3/2015 | Hachisuka | A61B 5/743 |
| | | | | 382/118 |
| 2016/0009175 | A1* | 1/2016 | McNew | G01C 21/3652 |
| | | | | 340/438 |
| 2016/0082979 | A1* | 3/2016 | Seder | G02B 27/0927 |
| | | | | 340/439 |
| 2016/0147499 | A1* | 5/2016 | Ryu | G06F 3/1454 |
| | | | | 715/748 |
| 2016/0250969 | A1* | 9/2016 | Nania | G09F 21/04 |
| | | | | 348/148 |
| 2016/0288708 | A1* | 10/2016 | Chang | G06V 20/597 |
| 2017/0032541 | A1* | 2/2017 | Barnett | G06T 11/001 |
| 2017/0120724 | A1* | 5/2017 | Furse | B60H 1/00985 |
| 2017/0132960 | A1* | 5/2017 | Kis-Benedek Pinero | |
| | | | | G06F 1/1637 |
| 2017/0313248 | A1* | 11/2017 | Kothari | H04N 23/69 |
| 2017/0330379 | A1* | 11/2017 | Bojanowski | G06T 19/006 |
| 2017/0349098 | A1* | 12/2017 | Uhm | G02B 27/0101 |
| 2018/0194227 | A1* | 7/2018 | Gussen | H04N 21/4122 |
| 2018/0251031 | A1* | 9/2018 | Liebau | B60K 37/02 |
| 2018/0251122 | A1* | 9/2018 | Golston | B60W 40/08 |
| 2018/0357233 | A1* | 12/2018 | Dazé | H04L 12/40 |
| 2019/0092170 | A1* | 3/2019 | Gassman | B60R 11/0235 |
| 2019/0132395 | A1* | 5/2019 | Hopkins | H04L 67/04 |
| 2019/0176845 | A1* | 6/2019 | Yoon | G06V 20/597 |
| 2019/0189087 | A1* | 6/2019 | Hélot | B60K 35/00 |
| 2019/0232786 | A1* | 8/2019 | Sasaki | B60K 37/06 |
| 2019/0281340 | A1* | 9/2019 | Sacra | B60R 11/0252 |
| 2019/0317357 | A1* | 10/2019 | Kishimoto | G02F 1/133305 |
| 2019/0355923 | A1* | 11/2019 | Kishimoto | H10K 50/84 |

FOREIGN PATENT DOCUMENTS

| | | |
|---|---|---|
| JP | 63-078816 A | 4/1988 |
| JP | 2000-142260 A | 5/2000 |
| JP | 2006-201853 A | 8/2006 |
| JP | 2009-208727 A | 9/2009 |
| JP | 2010-125945 A | 6/2010 |
| JP | 2015-098317 A | 5/2015 |
| JP | 2017-074876 A | 4/2017 |
| JP | 2017-203945 A | 11/2017 |
| WO | 2007/023900 A1 | 3/2007 |
| WO | 2016/115052 A1 | 7/2016 |
| WO | 2016/166160 A1 | 10/2016 |
| WO | 2017/191344 A1 | 11/2017 |

* cited by examiner ed by the environment can negatively impact the emotional state of an occupant. As a result, riding in the vehicle may be a less unenjoyable experience for the occupant.

As the foregoing illustrates, what is needed are more effective techniques for providing positive media experiences to occupants of a vehicle cabin.

AUGMENTED MEDIA EXPERIENCE IN A VEHICLE CABIN

CROSS-REFERENCE TO RELATED APPLICATIONS

This application is a divisional of U.S. patent application Ser. No. 16/240,495, filed on Jan. 4, 2019, which claims the priority benefit of the U.S. Provisional Patent application titled, "Configurable Moodroof for Augmented Spatial Audio/Video Experience," filed on Jan. 4, 2018, and having Application No. 62/613,709. The subject matter of each of these related applications is hereby incorporated herein by reference in its entirety.

BACKGROUND

Field of the Various Embodiments

The various embodiments relate generally to media systems and, more specifically, to an augmented media experience in a vehicle cabin.

Description of the Related Art

Vehicles typically include media systems that provide audio and/or video information and entertainment to the occupants of the vehicle. For example, an audio system commonly enables occupants to receive audio content from a radio, participate in a cell phone call, receive navigation commands from a navigation subsystem, receive safety warnings from an advanced driver assistance system (ADAS), and so forth. Similarly, a visual system commonly enables occupants to view information associated with audio content, view a map from a navigation subsystem, receive safety warnings from the ADAS, and so forth.

Typically, an in-vehicle visual system includes a display on the dashboard above the center console and may further include one or more additional displays on the rear faces of the seat headrests. The dashboard display, which may be a component of an in-vehicle infotainment system, is typically connected to a head unit via a wired interface. The dashboard display displays content received from the head unit, including, but not limited to, vehicle information, one or more user interfaces for controlling certain vehicle functions, audio content information, and entertainment content. A headrest display may be connected to the head unit via a wired or wireless interface, or may operate independently from the head unit. The headrest display may display content received from the head unit (e.g., entertainment content) or content received from another device (e.g., an optical disk player) connected to the headrest display.

One drawback of such media systems is that the displays oftentimes fail to provide an immersive media experience. For example, because the dashboard and headrest displays are relatively small and/or are implemented to display vehicle information to the driver, the screens typically do not provide an immersive visual experience for vehicle occupants. As a result, vehicle occupants often end up relying on the visual experiences provided by the environment outside of the vehicle, for example, as viewed through the vehicle windows. In many situations, however, the outside environment provides a poor visual and/or auditory experience for vehicle occupants. For example, if a vehicle is stuck in traffic and/or if the outside weather is poor, then the visual and/or auditory experience provided by the environment can nega-

SUMMARY

One embodiment sets forth method for displaying media content within a vehicle cabin. The method includes determining at least one state associated with the vehicle cabin based on sensor data from at least one sensor, receiving media content associated with the at least one state, and causing visual content associated with the media content to be displayed on at least one display surface positioned on a ceiling of the vehicle cabin.

Further embodiments provide, among other things, a system and one or more computer-readable storage media configured to implement the method set forth above.

At least one advantage and technological improvement of the disclosed techniques is that the ceiling of a vehicle cabin may be used as a display space for displaying media content to occupants in the vehicle cabin, while still allowing the ceiling to be opened in order to let natural light and air flow into the vehicle cabin.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1A:
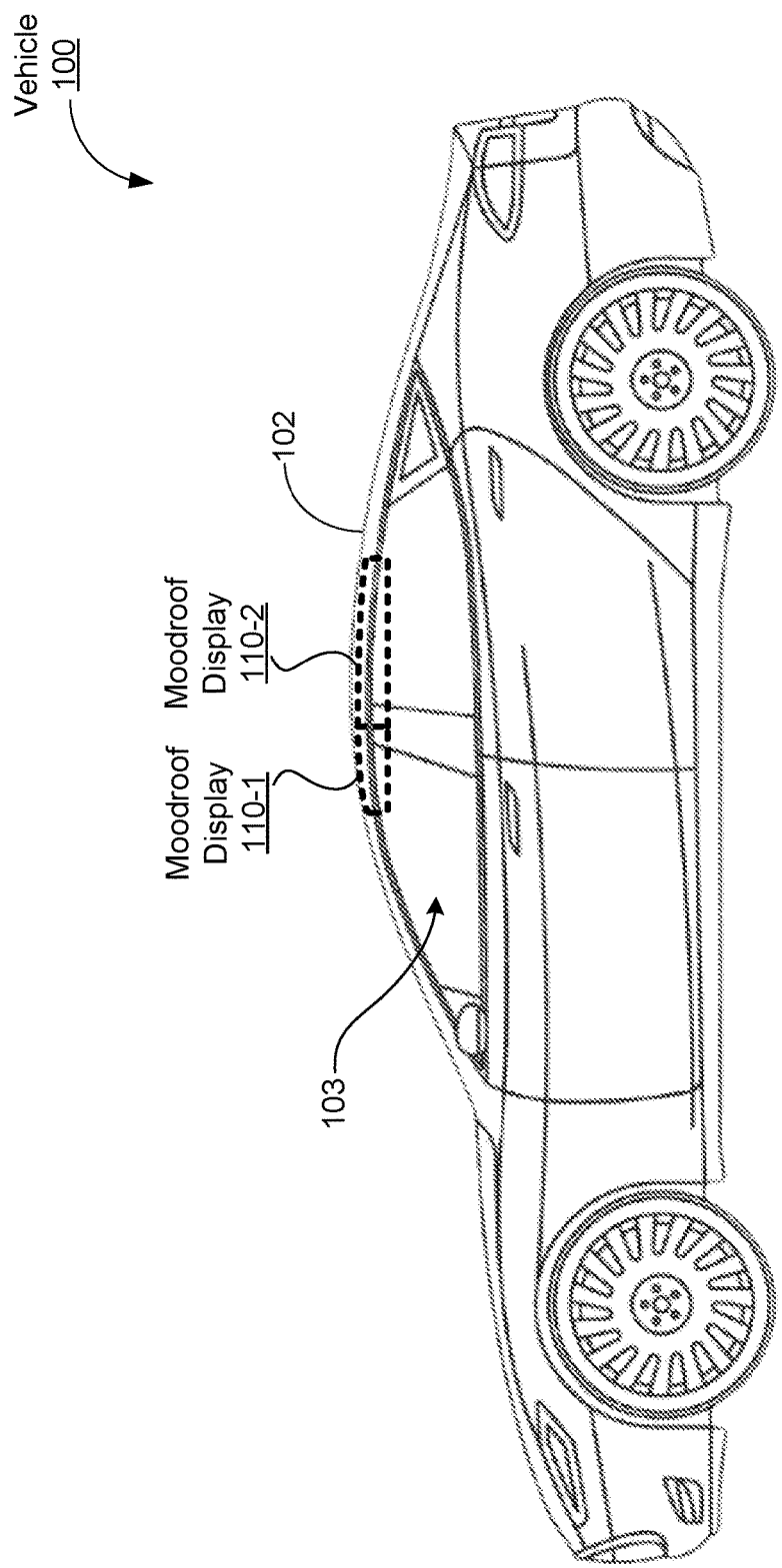
FIGS. 1A-1B are conceptual diagrams illustrating a moodroof display system in a vehicle, according to one or more aspects of the various embodiments.
Figure 1B:
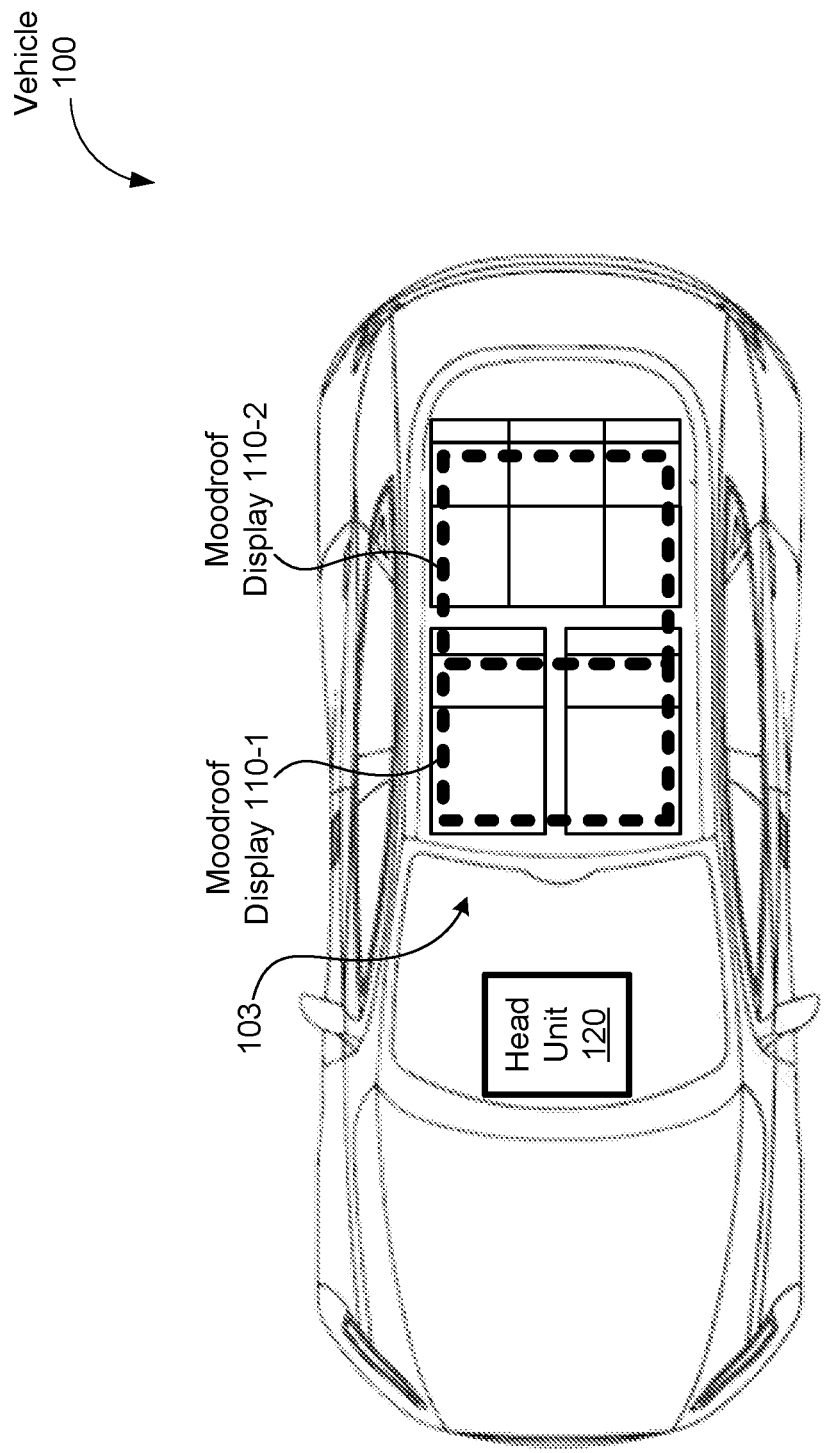

FIGS. 1A-1B are conceptual diagrams illustrating a moodroof display system in a vehicle 100, according to one or more aspects of the various embodiments. FIG. 1A illustrates a side view of an upper portion of the vehicle 100, and FIG. 1B illustrates an exposed top view of the vehicle 100.

The vehicle 100 includes a roof 102, which shelters the vehicle cabin 103 and components in the vehicle cabin 103 (e.g., seating, controls, steering wheel, etc.). In some embodiments, the roof 102 includes a sunroof (not shown). The sunroof may include one or more glass panels that can be moved to form an opening in the roof 102, in order to expose the vehicle cabin 103 to an environment outside of the vehicle 100.

The vehicle 100 further includes one or more moodroof displays 110 installed on the roof 102. The moodroof displays 110 may be installed on the roof 102 in lieu of, or in addition to, a sunroof. In various embodiments, the moodroof displays 110 runs parallel to the roof 102 and displays visual content towards the interior of the vehicle cabin. Each of the moodroof displays 110 is capable of displaying media content, under the direction and/or coordination of the head unit 120, to occupants in vehicle cabin 103. For example, media content may be output from the head unit 120 to the moodroof displays 110 for display to occupants in the vehicle cabin 103. In various embodiments, the moodroof displays 110-1 and 110-2 are display devices (e.g., liquid-crystal display (LCD) screens, light-emitting diode (LED) display screens, organic light-emitting diode (OLED) display screens, etc.) configured to output media content received from the head unit 120. In various other embodiments, a projection surface serves as the moodroof display in place of (or in addition to) one or more moodroof displays 110. One or more projectors may then be mounted on the roof 102 or at any other feasible location in the vehicle. The projector(s) receive media content from the head unit 120 and project the media content onto the projection surface.

As shown, vehicle 100 includes two moodroof displays 110-1 and 110-2, positioned on the roof 102 for viewing by occupants within the vehicle cabin 103. For example, moodroof display 110-1 is positioned above the front seating, and moodroof display 110-2 is positioned above the rear seating, as shown in FIG. 1B. It should be appreciated, however, that the positioning of the moodroof displays 110 shown in FIG. 1B is an example, and other positions on the roof 102 are possible. Furthermore, it should be appreciated that two moodroof displays having certain sizes and aspect ratios are shown only as examples, and that the moodroof display may include one, two, three, or more displays of any size, aspect ratio, and shape.

In various embodiments, at least one moodroof display 110 is capable of being opened and closed (e.g., moved to and from an open position and a closed position). For example, at least one moodroof display 110 may be mounted on a track and motor system. The at least one moodroof display 110 may then be movable via the track and motor system from a closed position to an open position, and vice versa. In some embodiments, a moodroof display may not display media content while it is at an open position. If a projection surface is used as the moodroof display, then the projection surface may be opened and closed, including partial opening and closing, by being retracted and extended, respectively. A projector may be disabled from projecting media content onto the projection surface while the projection surface is fully and/or partially open. In various embodiments, if multiple moodroof displays are installed on the roof 102, at least one of the multiple moodroof displays 110 is fixed.

The vehicle 100 includes a head unit 120. The head unit 120 includes, among other things, a moodroof media application 230 that controls media output to the moodroof displays 110. The head unit 120 may also include controls (not shown) for opening and closing the moodroof displays 110. The controls may be operation by occupants of the vehicle 100 to open and/or close one or more moodroof displays 110 in the vehicle 100. In some embodiments, the controls for opening and closing the moodroof may be located elsewhere in the vehicle 100 (e.g., on a portion of the roof 102 that the driver can reach). The moodroof opening/closing controls may be implemented in any technically feasible manner (e.g., buttons, switches, user interface displayed on a touch screen, etc.). The moodroof media application 230 may implement any number of techniques for delivering visual media content to the moodroof displays 110, including wired or wireless transmission. In some embodiments, media content that is outputted to the moodroof displays 110 may be acquired from storage located in the vehicle (e.g., at the head unit 120), a device communicatively coupled to the vehicle 100 (e.g., a mobile device communicatively coupled to the head unit 120), and/or a cloud service communicatively coupled to the vehicle 100.

Figure 2:
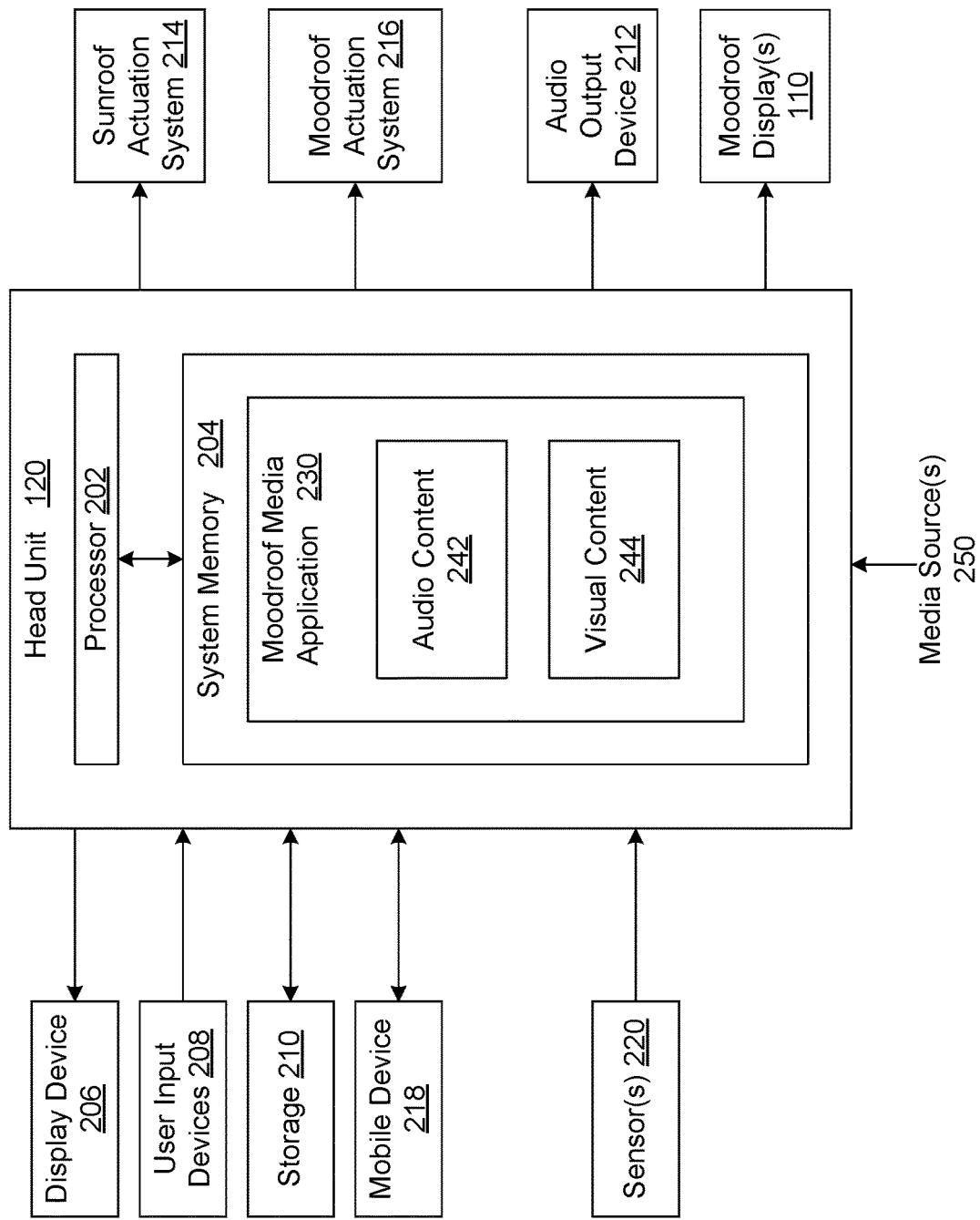
FIG. 2 is a more detailed illustration of the head unit of FIG. 1, according to one or more aspects of the various embodiments.

FIG. 2 is a more detailed illustration of the head unit 120 of FIG. 1, according to one or more aspects of the various embodiments. As shown, the head unit 120 includes, without limitation, a processor 202 and a system memory 204. The processor 202 and the system memory 204 may be implemented in any technically feasible fashion. For example, and without limitation, in various embodiments, any combination of the processor 202 and the system memory 204 may be implemented as a stand-alone chip or as part of a more comprehensive solution that is implemented as an application-specific integrated circuit (ASIC) or a system-on-a-chip (SoC).

The processor 202 generally comprises a programmable processor that executes program instructions to manipulate input data. The processor 202 may include any number of processing cores, memories, and other modules for facilitating program execution. The processor 202 may receive input via any number of user input devices 208 and generate pixels for display on the display device 206. The user input devices 208 may include various types of input devices, such as buttons, a microphone, cameras, a touch-based input device integrated with a display device 206 (i.e., a touch screen), and other input devices for providing input data to the head unit 120. The processor 202 may also generate pixels for display on other display devices in the vehicle 100, such as moodroof displays 110.

The head unit 120 may support any number of input and output data types and formats. For example, and without limitation, in some embodiments, the head unit 120 may include built-in Bluetooth for hands-free calling and audio streaming, universal serial bus (USB) connections, speech recognition, camera inputs for any number of views (e.g., rear view, front view, cabin interior view, roof exterior view, etc.), video outputs for any number and type of displays (e.g., headrest-mounted displays, moodroof displays 110), and any number of audio outputs. In general, any number of sensors, displays, receivers, transmitters, etc. may be integrated into the head unit 120 or may be implemented externally to the head unit 120. External devices may communicate with the head unit 120 in any technically feasible fashion. In alternate embodiments, the vehicle 100 may include any number of standalone units that implement any amount of the functionality described herein for the head unit 120. The standalone units are not integrated with the head unit 120 and, in some embodiments, may replace the head unit 120.

The head unit may output audio content to one or more audio output devices 212 (e.g., via the audio outputs). Examples of audio output devices include, without limitation, one or more speakers in the vehicle 100.

The system memory 204 generally comprises storage chips such as random access memory (RAM) chips that store application programs and data for processing by the processor 202. In various embodiments, the system memory 204 includes non-volatile memory such as optical drives, magnetic drives, flash drives, or other storage. In some embodiments, storage 210 may supplement the system memory 204. The storage 210 may include any number and type of external memories that are accessible to the processor 202. For example, and without limitation, the storage 210 may include a Secure Digital Card, an external Flash memory, a portable compact disc read-only memory (CD-ROM), an optical storage device, a magnetic storage device, or any suitable combination of the foregoing.

In addition to or instead of the moodroof media application 230, the system memory 204 may include any number and type of other applications. For instance, in some embodiments, the system memory 204 may include an entertainment subsystem, a navigation subsystem, and an advanced driver assistance subsystem (ADAS), to name a few. The entertainment subsystem may include software that controls any number and type of entertainment components, such as an AM/FM radio, a satellite radio, an audio and video computer files player (e.g., MP3 audio files player), an optical media player (e.g., compact disc (CD) player), and so forth. The navigation subsystem may include any number and type of applications that enable a driver to efficiently navigate the vehicle. For example, the navigation subsystem could include maps, direction routing software, and the like. The ADAS may include functionality designed to increase driver safety, automate driving tasks, and the like. In some embodiments, the functionality of the moodroof media application 230 may be integrated into or distributed across any number of other applications (e.g., an infotainment system, the entertainment subsystem).

The head unit 120 may further be communicatively coupled to a mobile device 218. Examples of mobile devices 218 include, without limitation, smartphones, tablets, portable media players, portable gaming devices, and laptop computers. The head unit 120 may communicate with the mobile device 218 in any technically feasible fashion (e.g., Bluetooth, Wi-Fi, USB, etc.). The head unit 120 may access content stored in mobile device 218. Further, head unit 120 may receive user inputs and/or commands from the mobile device 218 (e.g., from an app on the mobile device 218 configured to control various functions of the head unit 120).

The head unit 120 may further communicate with a moodroof actuation system 216 and optionally a sunroof actuation system 214. The moodroof actuation system 216 includes motors, tracks, etc. to implement movement of the moodroof displays 110. If the vehicle 100 is equipped with a sunroof, the sunroof actuation system 214 includes motors, tracks, etc. to implement movement of the sunroof. The head unit 120, in response to user inputs via moodroof opening/closing controls (e.g., implemented via user input devices 208) and/or instruction signals from moodroof media application 230, may generate control signals to control the moodroof actuation system 216, for example, in order to open or close one or more moodroof displays 110. Similarly, the head unit 120, in response to user inputs via sunroof opening/closing controls (e.g., implemented via user input device 208) and/or instruction signals from moodroof media application 230, may generate control signals to control the sunroof actuation system 214, for example, in order to open or close the sunroof. The moodroof opening/closing controls (e.g., a user input device 208 configured to control the moodroof displays 110) may be located on the head unit 120 or elsewhere in the vehicle 100 (e.g., on a portion of the roof 102 that the driver can reach).

In general, a conventional vehicle infotainment system provides visual media content to one or more conventional display devices 206, which may be located near the dash and/or mounted on a headrest. In some situations, conventional display devices 206 are unable to provide immersive visual experiences for occupants in vehicle 100. As a result, vehicle occupants rely on visual experiences provided by the environment outside of the vehicle 100 (e.g., as viewed through the vehicle windows). Often, however, the outside environment provides a poor visual and/or auditory experience for vehicle occupants. These poor visual and/or auditory experiences can negatively impact the emotional state of an occupant, making the ride in the vehicle 100 a less enjoyable experience for the occupant.

Displaying Media Content on a Moodroof Display

To improve the media experience for occupants of the vehicle 100, the moodroof media application 230 may receive visual media content 244 from the head unit 120 and output the visual media content to the moodroof displays 120. Optionally, the moodroof media application 230 may also receive audio media content 242 from the head unit 120 and output the audio media content to audio output device 212. In various embodiments, the moodroof media application 230 may acquire and/or generate visual and/or audio media content based on sensor data received from one or more sensors 220 and/or one or more user inputs (e.g., inputs received via user input devices 208 and/or mobile device 218). In some embodiments, the moodroof media application 230 may determine one or more states associated with the vehicle cabin 103 based on the sensor data and determine the media content to acquire and/or generate based on the one or more states. The one or more states associated with the vehicle cabin may include, without limitation, the weather outside of the vehicle 100, the speed of the vehicle 100, the environment in which the vehicle 100 is traveling, the occupancy state of the vehicle cabin 103, and/or the emotional state(s) of one or more occupants of the vehicle 100. The moodroof media application 230 may acquire media content for output from one or more media sources 250, which may include system memory 204, storage 210, sensors 220, visual sensors 304 and 306, and/or mobile device 218. In various embodiments, the moodroof media application 230 may augment acquired media content (e.g., generate an augmented reality overlay over a camera image) and output the augmented media content. In this fashion, the moodroof media application 230 delivers media content to moodroof displays 110 to enhance the media experience of occupants of the vehicle 100.

Figure 3:
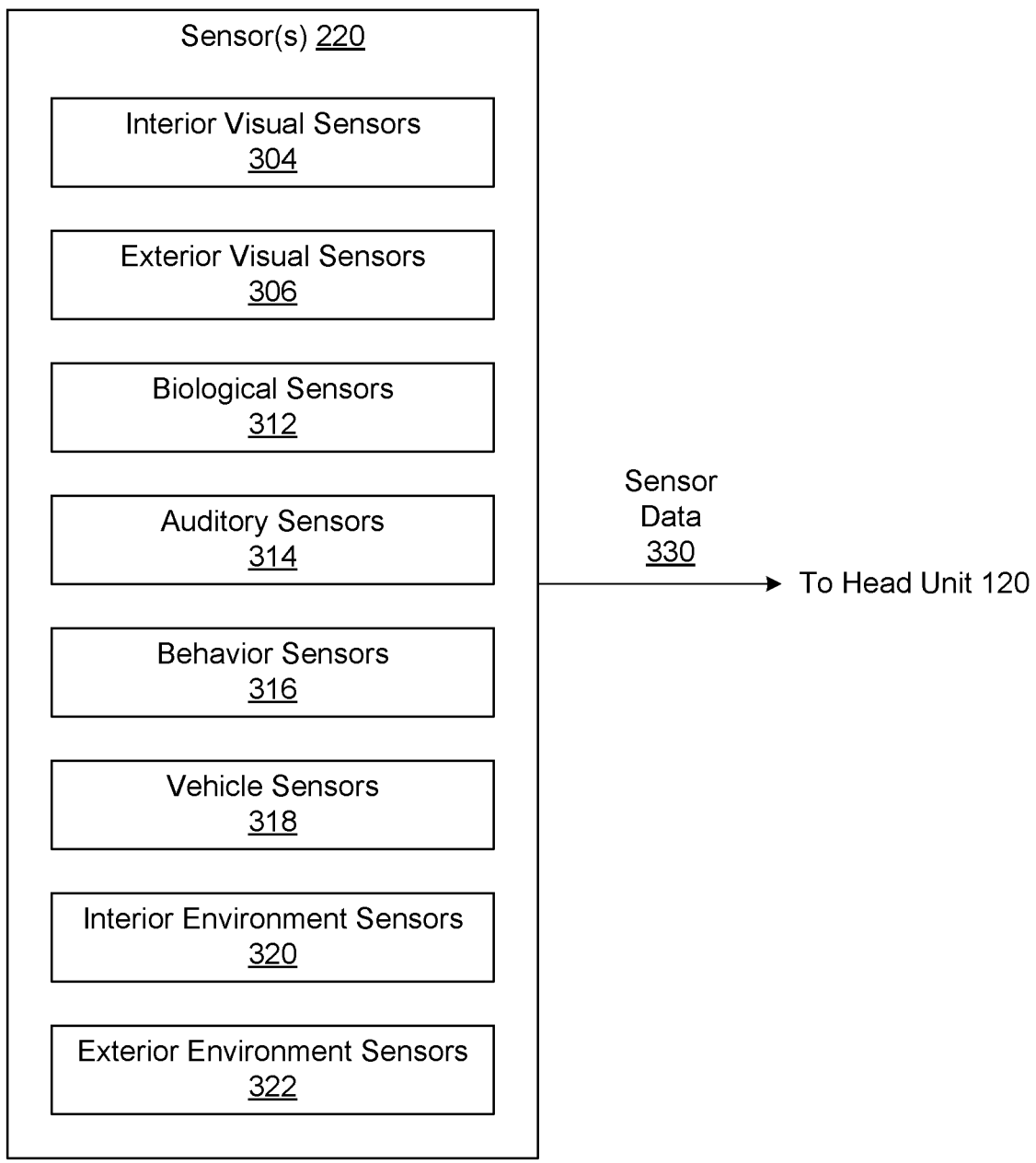
FIG. 3 is more detailed illustration of the sensors of FIG. 2, according to one or more aspects of the various embodiments.

FIG. 3 is a more detailed illustration of the sensors 220 of FIG. 2, according to one or more aspects of the various embodiments. As shown, sensors 220 may include interior visual sensors 304, exterior visual sensors 306, biological sensors 312, auditory sensors 314, behavior sensors 316, vehicle sensors 318, interior environment sensors 320, and exterior environment sensors 322. Head unit 120 receives sensor data 330 from one or more of sensors 220 and forwards the sensor data 330 to applications, subsystems, etc. within head unit 120, including, for example, moodroof media application 230.

The interior visual sensors 304 may acquire images of the vehicle cabin 103 and/or occupants in the vehicle cabin 103. The image data may include facial expressions, body postures, body positions, etc. of the occupants that may be indicative of the emotional state(s) and/or mood(s) of one or more of the occupants of the vehicle 100. The image data may further include views of the vehicle cabin 103 showing where occupants are located and how occupants are postured within the vehicle cabin 103. In some embodiments, the interior visual sensors 304 include, without limitation, any number and combination of infrared cameras, RGB cameras, camera arrays that provide multiple perspectives on a body and/or head of an occupant and/or multiple perspectives on the vehicle cabin 103, and depth cameras that sense body posture and body positioning.

The exterior visual sensors 306 may acquire images of the exterior of the vehicle 100, including an upward exterior view from the vehicle 100 (e.g., a view towards the sky from the vehicle 100) and optionally lateral exterior views from the vehicle 100 (e.g., views toward the sides, front, and rear of the vehicle 100). In some embodiments, the exterior visual sensors 304 include, without limitation, any number and combination of infrared cameras, RGB cameras, camera arrays that provide multiple perspectives on exterior views from the vehicle 100, and depth cameras that sense objects outside of the vehicle 100.

The biological sensors 312 produce biological data that may correlate with the emotional state(s) and/or mood(s) of one or more of the occupants of the vehicle 100. In some embodiments, the biological sensors 312 include, without limitation, any number and combination of Galvanic skin response sensors that measure emotional arousal, image sensors that detect blood oxygen levels, heat sensors that detect blood flow, optical sensors that detect blood flow, electroencephalography sensors that detect surface potentials of brains, magnetoencephalography sensors that detect neural activities, and the like.

The auditory sensors 314 produce audio data that may indicate the emotional state(s) and/or mood(s) of one or more of the occupants of the vehicle 100. More precisely, the words spoken by an individual as well as the way the individual speaks a given phrase are often indicative of sentiment and mood. In some embodiments, the auditory sensors 314 include, without limitation, any number and combination of microphones, microphone arrays, and the like.

The behavior sensors 316 may produce tactile data, electronic activity data, etc. that provide insight into the activities of individuals around the vehicle 100 as well as occupants within the vehicle 100. The detected activities may be indicative of the emotional state(s) and/or mood(s) of one or more of the occupants of the vehicle 100. For instance, in some embodiments, the behavior sensors 316 include, without limitation, any number of mobile usage sensors that detect usage of mobile devices. In general, a pattern of applications used by an occupant may correlate to a mood. For instance, if an application is categorized as a fun, social application, then the use of the application may correlate with a joyful, social mood.

In the same or other embodiments, the behavior sensors 316 include, without limitation, pressure sensors, touch sensors, acoustic sensors, and button press sensors that indicate how an occupant is placing their hands. The tactile data may be indicative of the mood of the occupant. For example, tactile data that an occupant is pressing keys with unnecessary force may indicate an agitated mood.

Vehicle sensor(s) 318 produce data that indicates one or more states and/or characteristics of the vehicle 100, including, without limitation, a linear speed of the vehicle 100, a turning speed and radius of the vehicle 100, distance travelled by the vehicle 100 on the current trip, time travelled by the vehicle 100 on the current trip, direction of travel by the vehicle 100, etc. In some embodiments, the vehicle sensors 318 include, without limitation, speedometers, accelerometers, compasses, timers, odometers, etc.

Interior environment sensors 320 produce data that indicates one or more states of the interior environment of the vehicle 100 (e.g., one or more states of the vehicle cabin 103), including, without limitation, a temperature within the vehicle cabin 103, a humidity within the vehicle cabin 103, an air pressure level within the vehicle cabin 103, a light intensity within the vehicle cabin 103, a rating of air quality within in the vehicle cabin 103, etc. In some embodiments, the interior environment sensors 320 include, without limitation, thermometers, hygrometers, barometers, lux meters, air quality meters, etc.

Exterior environment sensors 322 produce data that indicates one or more states of the exterior environment of the vehicle 100 (e.g., one or more states associated with the outside of the vehicle 100, such as road conditions), including, without limitation, a temperature outside of the vehicle 100, a humidity outside of the vehicle 100, an air pressure level outside of the vehicle 100, a light intensity outside of the vehicle 100, a rating of air quality outside of the vehicle 100, weather conditions outside of the vehicle 100, etc. In some embodiments, the exterior environment sensors 322 include, without limitation, thermometers, hygrometers, barometers, lux meters, air quality meters, etc.

Figure 4:
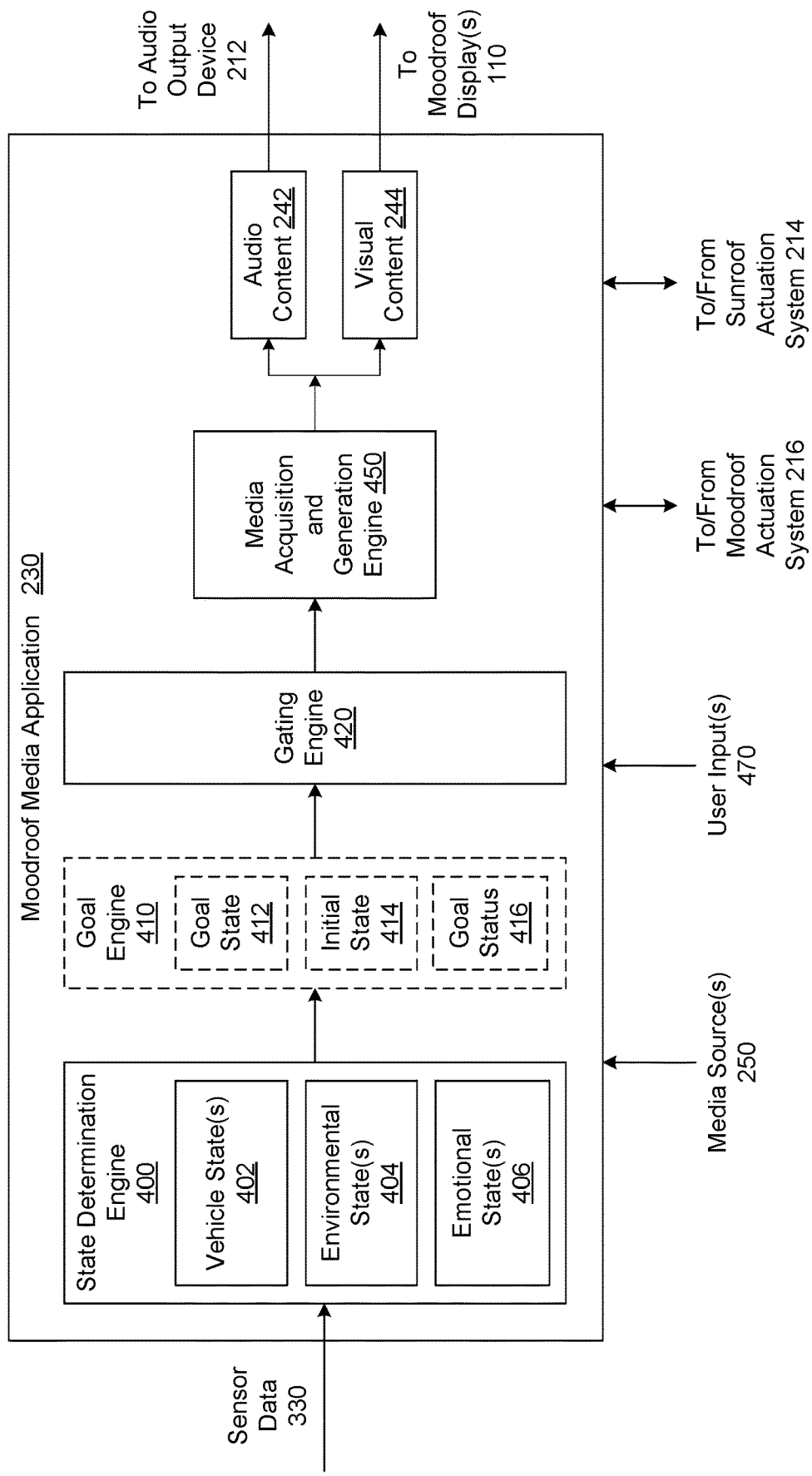
FIG. 4 is a more detailed illustration of the moodroof media application of FIG. 2, according to one or more aspects of the various embodiments.

FIG. 4 is a more detailed illustration of the moodroof media application 230 of FIG. 2, according to one or more aspects of the various embodiments. Moodroof media application 230 may include a state determination engine 400, a gating engine 420, a media acquisition and generation engine 450, and, optionally, a goal engine 410.

After the moodroof media application 230 receives sensor data 330 from the head unit 120, a state determination engine 400 processes the sensor data 330 to determine one or more vehicle states 402 (e.g., speed, turning speed, etc.), one or more environmental states 404 (e.g., temperature outside of vehicle 100, temperature inside vehicle cabin 103, views outside of vehicle 100, etc.), and/or one or more emotional states 406 of one or more occupants in the vehicle cabin 103.

More generally, each of the vehicle states 402, environmental states 404, and one or more emotional states 406 is associated with the vehicle cabin 103 in some way. For example, the speed of vehicle 100 is the speed of the vehicle cabin 103. As another example, the temperature outside of the vehicle 100 is a temperature that the vehicle cabin 103 may be exposed to if windows and/or a sunroof are open. As a further example, the emotional states of occupants in the vehicle cabin 103 represents a mood within the vehicle cabin 103.

As part of processing the data, the state determination engine 400 may execute any number of algorithms. For example, for determining emotional states 406 of occupants in the vehicle 100, the state determination engine 400 may execute algorithms suitable for determining emotional states and/or moods, such as natural language processing algorithms, sentiment analysis, and speech analysis. For vehicle states 402 and environmental states 404, the state determination engine 404 may execute any number of suitable algorithms for determining these states. Further, the state determination engine 400 may perform disambiguation operations based on a combination of data received from different sensor types. Subsequently, for each type of state being determined, the state determination engine 400 determines the state associated with the user based on the processed data. The state determination engine 400 may determine the vehicle states 402, environmental states 404, and emotional states 406 in any technically feasible fashion. For example, the state determination engine 400 could implement any number and type of heuristics, rules, and/or machine learning algorithms, in any combination, to determine the vehicle states 402, environmental states 404, and emotional states 406. In some embodiments, the state determination engine 400 may include any number of sub-engines specific to respective types of vehicle states 402, environmental states 404, and/or emotional states 406, and configured to determine the respective states.

For instance, in some embodiments, the state determination engine 400 (or an emotional state sub-engine) comprises a support vector machine, Bayes classifier, or a Markov chain. In other embodiments, the state determination engine 400 includes an emotion categorization model that maps facial images, biological data, and application usage data to an emotional state 406. In some embodiments, the state determination engine 400 correlates processed data to previously observed data that is associated with a known emotion. In the same or other embodiments, the state determination engine 400 implements statistical algorithms to determine the emotional states 406. Further, in some embodiments, the state determination engine 400 may determine an emotional state for the occupants as a collective. Alternatively, the state determination engine may determine an emotional state for each occupant and then aggregate the emotional states (e.g., an average emotional state, a median emotional state, a weighted aggregate).

As depicted with dotted boxes, the goal engine 410 may be implemented in some embodiments, but may be omitted in other embodiments. Embodiments in which the goal engine 410 is implemented operate in a "goal mode," while embodiments in which the goal engine 410 is omitted operate in a "non-goal mode." In some embodiments, the goal engine 410 may be configured to operate selectively in the goal mode based on any technically feasible criteria (e.g., a configurable setting).

As shown, the goal engine 410 includes, without limitation, a goal state 412, an initial state 414, and a goal status 416. Initially, the goal engine 410 determines the goal state 412 based on the one or more states determined by the state determination engine 400, such as emotional states 406. The goal engine 410 may determine the goal state 412 in any technically feasible fashion. For example, the goal engine 410 could implement any number and type of heuristics, rules, and/or machine learning algorithms, in any combination, to generate the goal state 412 based on the emotional states 406. The goal engine 410 may determine a collective goal state 412 for the occupants in any technically feasible fashion and based on any number of the emotional states 406. For example, the goal engine 410 could generate the collective goal state 412 as a weighted aggregate of the emotional states 406, where the emotional states 406 associated with certain moods are more heavily weighted than the other emotional states 406.

After the goal engine 410 determines the goal state 412, the goal engine 410 sets the initial state 414 to reflect the emotional state 406 and the goal status 416 to indicate that the goal state 412 is a new goal state 412. Subsequently, as the moodroof media application 230 and moodroof displays 110 operate, the goal engine 410 receives an updated emotional state 406. The goal engine 410 then updates the goal status 416 to reflect whether the moodroof media application 230 is successfully transitioning the emotional state 406 associated with the target occupant from the initial state 414 to the goal state 412.

The goal engine 410 may also regenerate the goal state 412, the initial state 414, and the goal status 416 based on any regeneration criteria (e.g., when the goal state 412 is reached). In some alternate embodiments, the goal engine 410 includes neither the initial state 414 nor the goal status 416. In such embodiments, upon receiving a new emotional state 406, the goal engine 410 re-generates the goal state 412 based on the new emotional state 406. Notably, because emotions are often transitory, the goal state 412 may not be reached before the goal engine 410 generates a new goal state 412 based on a new emotional state 406.

In some embodiments, the goal engine 410 may operate in conjunction with user inputs 470 to the head unit 120. For example, occupants may be presented with a user interface option (e.g., a touch screen button via user input devices 208) to set the goal state to a specific state (e.g., "make us happy"). In response to the user input 470 corresponding to activation of the user interface option, the goal engine 410 sets the goal state 412 to a state (e.g., "happy") associated with the user interface option, sets the initial state 414 to reflect the emotional states 406, and sets the goal status 416 to indicate that the specific goal state 412 is a new goal state 412. Subsequently, as the moodroof media application 230 and moodroof displays 110 operate, the goal engine 410 receives an updated emotional state 406. The goal engine 410 then updates the goal status 416 to reflect whether the moodroof media application 230 is successfully transitioning the emotional state 406 associated with the target occupant from the initial state 414 to the specific goal state 412.

The gating engine 420 determines whether the moodroof media application 230 is to provide visual and/or audio media content to the occupants based on the states 402, 404, 406 and/or based on user inputs. The gating engine 420 may determine whether the moodroof displays 110 are to provide visual media content to the occupants in any technically feasible fashion. For example, if any of the occupants made user inputs 470 to the head unit 120 to play specific media content on the moodroof displays 110, then the gating engine 420 could determine that the specific media content will be played via the moodroof displays 110 and that the states 402, 404, 406 may be disregarded. In other words, the user input selecting specific content to play may override playback of media content that is acquired and/or generated based on the states 402, 404, 406. If no specific media content is selected by the occupants, the gating engine 420 may determine that visual media content may be provided to the occupants based on the states 402, 404, 406, and optionally further based on techniques that take into consideration the goal state 412, the initial state 414, and/or the goal status 416.

If the gating engine 420 determines that the moodroof displays 110 are not to provide visual media content to the occupants, then the gating engine 420 configures the moodroof displays 110 to cease providing visual media content to the occupants (e.g., disable the moodroof displays 110 from displaying content). The gating engine 420 may also ensure that the moodroof media application 230 does not acquire or generate visual media content 244 until the gating engine 420 determines that the moodroof displays 110 are to provide visual media content to the occupants. The gating engine 420 may configure the moodroof displays 110 to cease providing audio content to the occupants in any technically feasible fashion. For example, if a moodroof display 110 is being moved to an open position or is at the open position, the gating engine 420 may determine that the moodroof display 110 is not to provide visual media content to the occupants. The gating engine 420 then configures the moodroof displays 110 to cease providing audio content to the occupants (e.g., by fading out any content being provided). The gating engine 420 may determine the position of the moodroof displays 110 via communications with the moodroof actuation system 216 and/or the sunroof actuations system 214 (e.g., the moodroof actuation system 216 can signal the display positions to the moodroof media application 230).

If, however, the gating engine 420 determines that moodroof displays 110 are to provide visual media content to the occupants, then the media acquisition and generation engine 450 acquires and/or generates the visual media content 244 based on the states 402, 404, 406 and/or user inputs 470 and, optionally, source visual media content received from any number of the media sources 250. For example, the media acquisition and generation engine 450 may acquire visual media content from system memory 204, storage 210, interior visual sensors 304, exterior visual sensors 306, and/or a mobile device 218 associated with an occupant. The media acquisition and generation engine 450 may generate visual media content, including combining different pieces of visual media content, in any technically feasible manner.

In some embodiments, if moodroof displays 110 are to provide visual media content to the occupants, then the gating engine 420 may automatically signal the moodroof actuation system 216 to close the moodroof displays 110. Similarly, if the sunroof is at an open position and moodroof displays 110 are to provide visual media content to the occupants, then the gating engine 420 may automatically signal the sunroof actuation system 214 to close the sunroof as well. Further, if moodroof displays are integrated with the sunroof, the gating engine 420 may automatically signal the sunroof actuation system 214 to close the sunroof, and correspondingly close the integrated moodroof displays.

As noted above, the media acquisition and generation engine 450 may acquire source visual media content received from any number of the media sources 250, and generate visual media content, including combining different pieces of visual media content, in any technically feasible manner. For example, if the time of day is nighttime and the sky is cloudy outside, the media acquisition and generation engine 450 may acquire and/or generate an image (e.g., an image of a clear night sky, a star-filled night sky, or an aurora) in order to positively affect the emotional states of the occupants. As another example, if the time of day is nighttime and the sky is clear outside, the media acquisition and generation engine 450 may acquire camera images of the sky from exterior visual sensors 306, and generate an augmented reality overlay (e.g., information on visible astronomical objects) to be overlaid over the camera images, in order to entertain and/or positively affect the emotional states of the occupants. The moodroof media application 230 transmits the acquired and/or generated visual media content 244 to the moodroof displays 110 via the head unit 120.

Additional, non-limiting examples of media content that may be acquired and/or generated are as follows. If the vehicle is travelling through an arid environment, the media acquisition and generation engine 450 may acquire and/or generate an image of a forest, an undersea environment with animated sea creatures, or a stream. If the time of day is daytime and the sky is cloudy outside, then the media acquisition and generation engine 450 may acquire and/or generate an image of a sunny clear sky. These and other examples of media content may be acquired and/or generated in order to positively affect the emotional states of the occupants and/or enhance the enjoyment of the occupants while riding the vehicle 100.

In various embodiments, the moodroof media application 230 may also acquire and/or generate audio media content 242 in a similar manner as the visual media content 244. The audio media content 242 may be acquired and/or generated in coordination with the visual media content 244. The moodroof media application 230 transmits the acquired and/or generated audio media content 242 to the audio output device 212 via the head unit 120. The moodroof media application 230 may provide audio media content 242 to the audio output device 212 even while the moodroof displays 110 are not displaying any content (e.g., because the moodroof displays 110 are at the open position and thus configured to cease displaying content). In some embodiments, the visual media content 244 further includes ambient lighting within the vehicle cabin. For example, the moodroof media application 230 may control the ambient lighting within the vehicle cabin 103 based on similar techniques as those described for acquiring and generating visual media content, as described above.

Opening and Closing a Moodroof Display

Figure 5A:
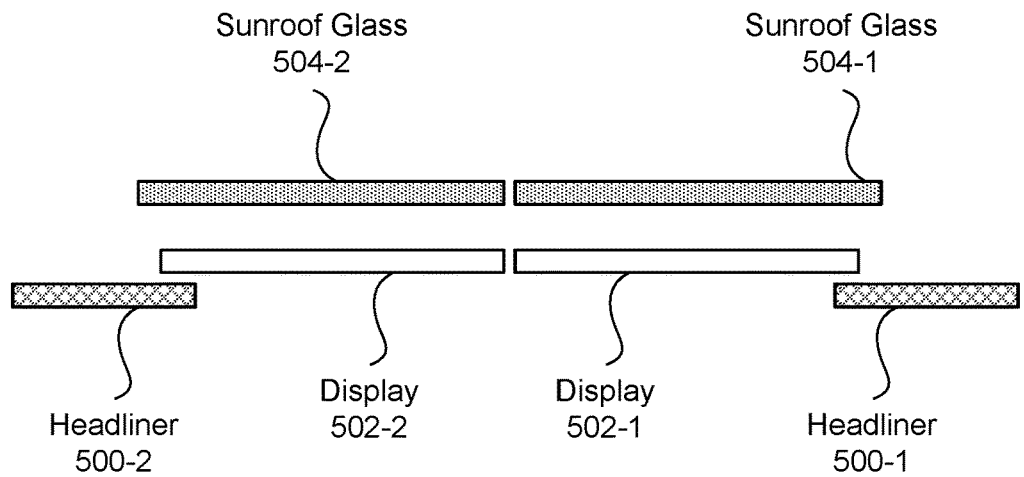
FIGS. 5A-5E are diagrams illustrating the operation of moodroof displays, according to one or more aspects of the various embodiments.

FIGS. 5A-5E are diagrams illustrating operation of example moodroof displays 502, according to one or more aspects of the various embodiments. As shown, FIG. 5A illustrates moodroof displays 502, sunroof glass panels 504, and a headliner 500 of a vehicle 100 (e.g., the ceiling of the vehicle cabin 103). The moodroof displays 502 are separate from the sunroof glass panels 504. In various embodiments, the moodroof displays 502 are located below the sunroof panels 504. In FIGS. 5A-5E, moodroof display 502-2 and sunroof panel 504-2 are fixed, and moodroof display 502-1 and sunroof panel 504-1 are movable. Thus, FIGS. 5A-5E illustrate an example implementation of moodroof displays 110 in which the moodroof displays 110 are display surfaces that are separate from the panels of the sunroof and that may be moved independently of the sunroof panels.

As shown in FIG. 5A, moodroof display 502-1 and sunroof panel 504-1 are in respective closed positions. Moodroof display 502-1 is horizontally adjacent to moodroof display 502-2, and sunroof panel 504-1 is horizontally adjacent to sunroof panel 504-2. While moodroof display 502-1 is at the closed position, moodroof display 502-1 is configured to display content. In various embodiments, moodroof displays 502 are opaque—preventing light from passing through the moodroof displays 502—regardless of whether the moodroof displays 502 are displaying content or whether the moodroof displays 502 are in the open position.

Figure 5B:
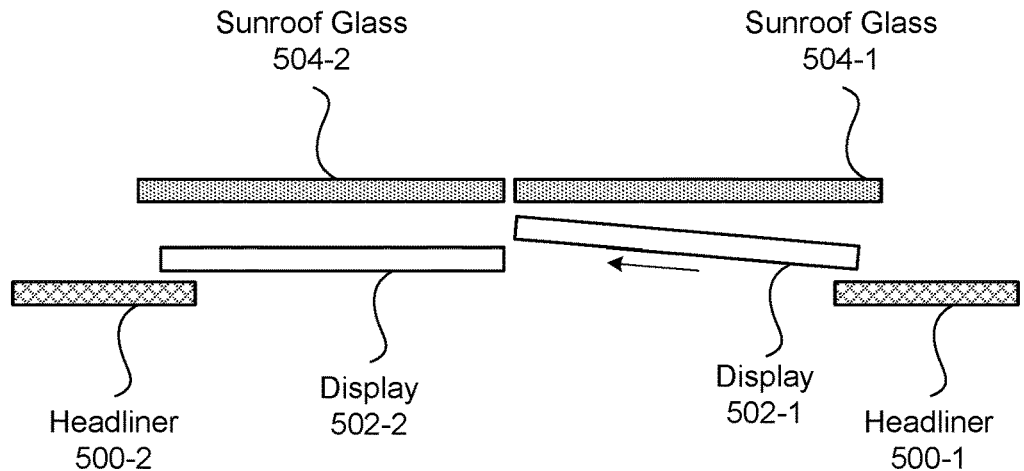

FIG. 5B shows moodroof display 502-1 beginning to move to an open position. For example, an occupant may activate a moodroof opening option via user input devices 208 and/or other moodroof opening/closing controls. As another example, the moodroof media application 230 may automatically activate movement of the moodroof display 502-1 to an open position. In response, the head unit 102 sends signals to moodroof actuation system 216 to move moodroof display 502-1 towards an open position. The moodroof actuation system 216 angles moodroof display 502-1 at an angle that is directed towards a space between sunroof panel 504-2 and moodroof display 502-2.

While the moodroof display 502-1 is angled and/or moving towards the open position, moodroof display 502-1 may be configured to cease displaying content. For example, the gating engine 420, in response to angling and/or movement of moodroof display 502-1, could determine that moodroof display 502-1 is being opened and, in response, could cease displaying content on moodroof display 502-1. For example, the gating engine 420 may power down the moodroof display 502-1 and/or fade out any content being displayed on moodroof display 502-1 as the moodroof display 502-1 is moving towards the open position.

Figure 5C:
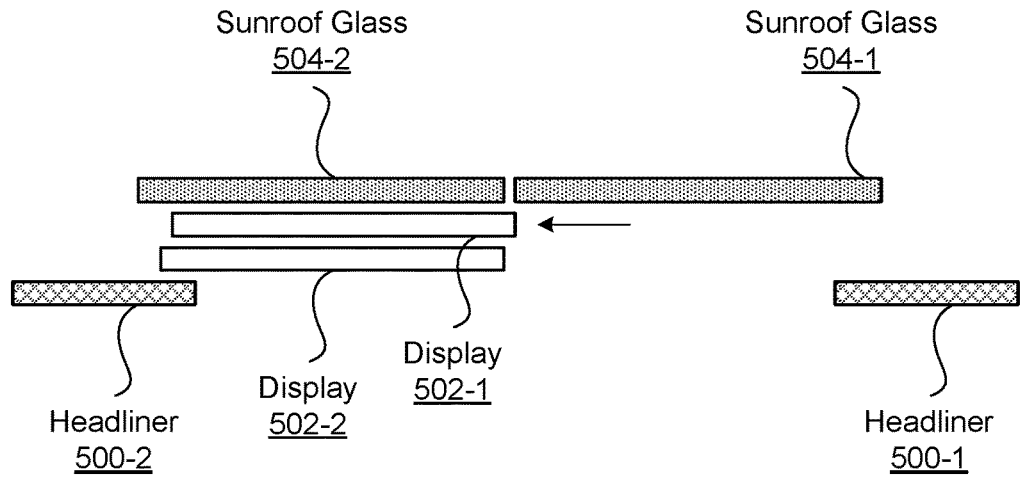

The moodroof actuation system 216 then moves moodroof display 502-1 (e.g., along tracks of the moodroof actuation system 216) into the space between sunroof panel 504-2 and moodroof display 502-2, as shown in FIG. 5C. When moved into this space, the moodroof display 502-1 is in the open position. When in the open position, moodroof display 502-1 may be configured to not display content, and moodroof media application 230 may not output visual content 244 to moodroof display 502-1. However, moodroof display 502-2 may still be configured to display content while moodroof display 502-1 is in the open position.

Figure 5D:
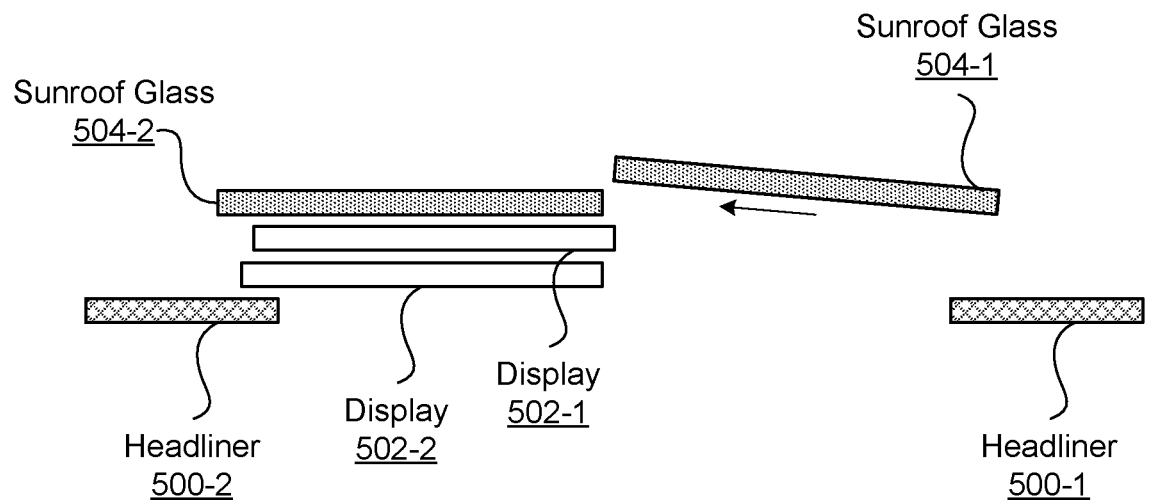

As shown in FIG. 5C, sunroof panel 504-1 is still in the closed position. While sunroof panel 504-1 is in the closed position, light from outside of the vehicle may pass through the sunroof panel 504-1, but air from outside of the vehicle is restricted from entering into the vehicle via the vehicle cabin ceiling. Vehicle occupants may activate a sunroof opening option (e.g., via user input devices 208 and/or other sunroof opening/closing controls) to open the sunroof panel 504-1. In response, the head unit 102 sends signals to sunroof actuation system 214 to move sunroof panel 504-1 to an open position. The sunroof actuation system 214 initiates movement of the sunroof panel 504-1 by angling the sunroof panel 504-1 at an angle that is directed towards a space above sunroof panel 504-2, as shown in FIG. 5D, and moves the sunroof panel 504-1 towards an open position in that space.

Figure 5E:
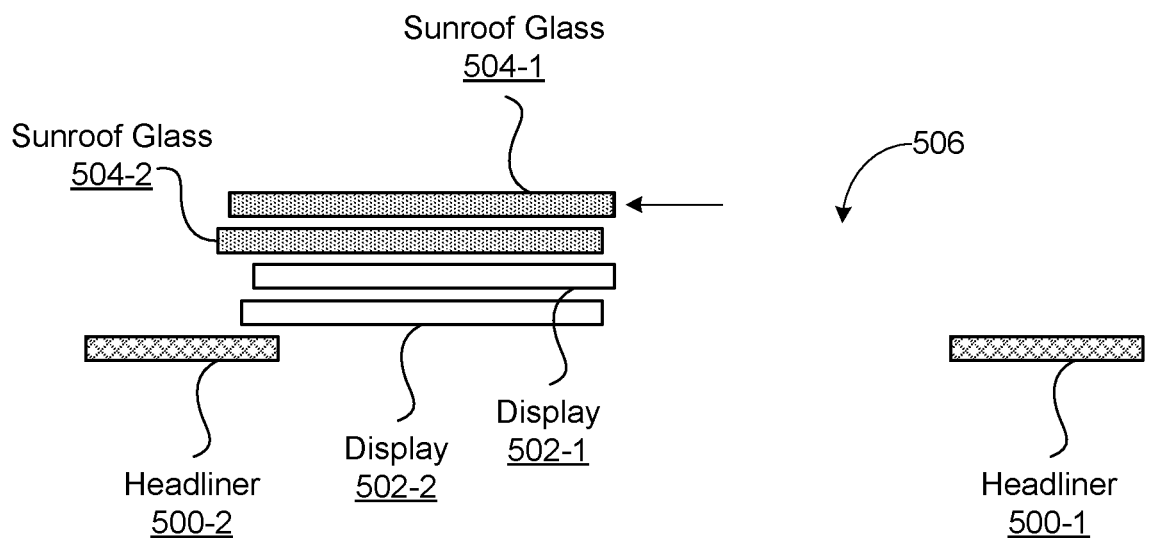

As shown in FIG. 5E, the sunroof panel 504-1 has completed movement to the open position above sunroof panel 504-2. With both moodroof display 502-1 and sunroof panel 504-1 at respective open positions, an opening 506 through the vehicle roof has been created. Air can flow through the vehicle cabin via the opening 506, and light can pass through the opening 506 as well.

To close the sunroof panel 504-1 and/or moodroof display 502-1, the steps shown in FIGS. 5A-5E may be reversed. For example, the sunroof panel 504-1 may move back to its closed position, shown in FIGS. 5A-5C, in response to user inputs and/or instruction from moodroof media application 230. Moodroof display 502-1 moves back to its closed position, shown in FIG. 5A.

It should be appreciated that the moodroof displays 502 and sunroof panels 504 may be arranged in any technically feasible manner. For example, the moodroof displays 502 may be manufactured to have a thickness that fits into a space between moodroof display 502-2 and sunroof panel 504-2, while still allowing the top of the sunroof panels 504 to be flush with the top of the vehicle roof when in the closed position. Further, the moodroof actuation system 216 and sunroof actuation system 214 may be implemented in any technically feasible manner. For example, the moodroof actuation system 216 may have tracks and motors configured to move moodroof display 502-1, as shown in FIGS. 5A-5C. Furthermore, while FIGS. 5A-5E shows a fixed moodroof display 502-2 and a fixed sunroof 504-2, moodroof display 502-2 and/or sunroof panel 504-2 may be configured to be moveable in any technically feasible manner in order to move between respective open and closed positions.

Figure 6A:
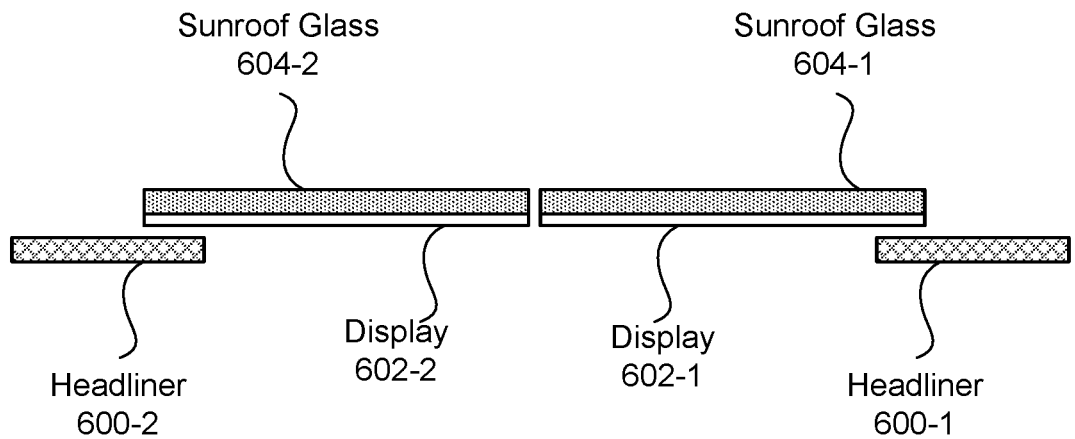
FIGS. 6A-6C are diagrams illustrating the operation of further moodroof displays, according to one or more aspects of the various embodiments.
Figure 6B:
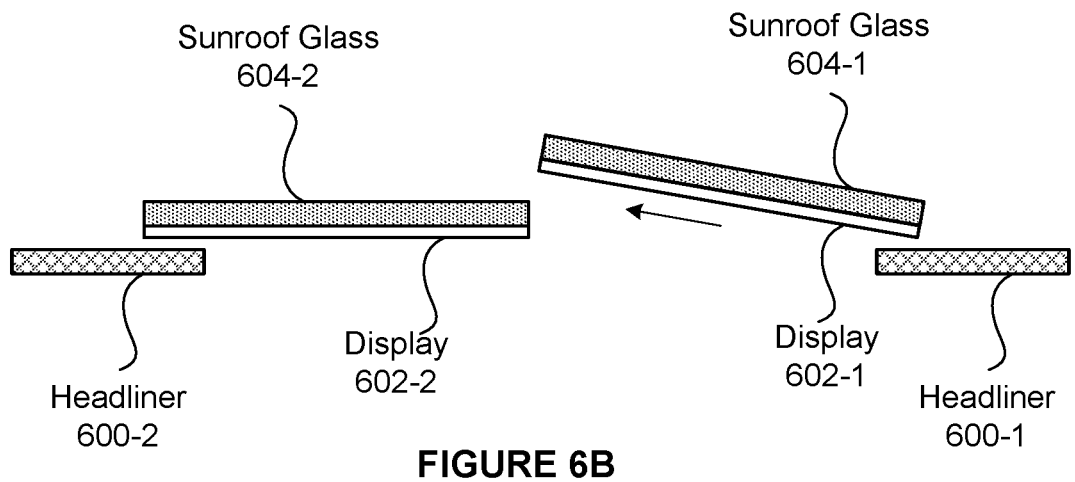
Figure 6C:
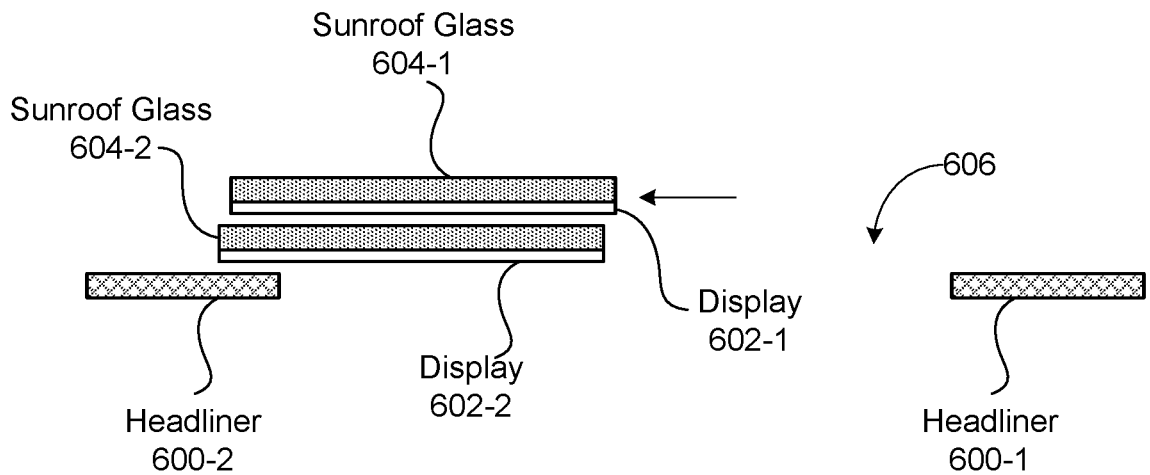

FIGS. 6A-6C are diagrams illustrating the operation of a further example of moodroof displays 602, according to one or more aspects of the various embodiments. As shown, FIG. 6A illustrates moodroof displays 602, sunroof glass panels 604, and a headliner 600 of a vehicle (e.g., the ceiling of the vehicle cabin 103). The moodroof displays 602 are integrated with the sunroof glass panels 604. For example, moodroof display 602-1 is integrated with sunroof panel 604-1, and moodroof display 602-2 is integrated with sunroof panel 604-2. In some embodiments, the integrated moodroof display 602-1 is fixed to sunroof panel 604-1 and may flex along with sunroof panel 604-1. Similarly, the integrated moodroof display 602-2 is fixed to sunroof panel 604-2 and may flex along with sunroof panel 604-2. In FIGS. 6A-6C, sunroof panel 604-2 is fixed. Sunroof panel 604-1 is moveable, and moodroof display 602-1 moves along with sunroof panel 604-1. Thus, FIGS. 6A-6C illustrate an example implementation of moodroof displays 110 in a vehicle 100, in which the moodroof displays are display surfaces that are integrated with sunroof panels.

In some embodiments, moodroof displays 602 are thin LED displays fixed to the sunroof panels 604. Further, in some embodiments, moodroof displays 602 are semi-transparent and, thus, are able to act as shading that allows some external light through even when the sunroof panels 604 are in a closed position.

As shown in FIG. 6A, sunroof panel 604-1 and moodroof display 602-1 are in a closed position. Sunroof panel 604-1 is horizontally adjacent to sunroof panel 604-2. While sunroof panel 604-1 is in the closed position, moodroof display 602-1 may be configured to display content.

FIG. 6B shows sunroof panel 604-1 beginning to move to an open position. For example, an occupant may activate a moodroof (or sunroof) opening option via user input devices 208 and/or other moodroof (or sunroof) opening/closing controls. As another example, the moodroof media application 230 may automatically activate movement of the sunroof 604-1 to an open position. In response, the head unit 102 sends signals to sunroof actuation system 214 to move sunroof display 602-1 to an open position. The sunroof actuation system 214 angles sunroof panel 604-1 at an angle that is directed towards a space above sunroof panel 604-2.

While the sunroof panel 604-1 is angled and/or moving towards the open position, moodroof display 602-1 may be configured to cease displaying content. For example, the gating engine 420, in response to angling and/or movement of sunroof panel 604-1, could determine that sunroof panel 604-1 is being opened and, in response, could cease displaying content on moodroof display 602-1. For example, the gating engine 420 may power down the moodroof display 602-1 and/or fade out any content being displayed on moodroof display 602-1 as the sunroof panel 604-1 is moving towards the open position.

The sunroof actuation system 214 then moves sunroof 604-1 (e.g., along tracks of the sunroof actuation system 214) into the space above sunroof panel 604-2, as shown in FIG. 6C. When moved into this space, the sunroof panel 604-1 is in the open position. When the sunroof panel 604-1 is in the open position, moodroof display 602-1 may be configured to not display content, and moodroof media application 230 may not output visual content 214 to moodroof display 602-1. However, moodroof display 602-2 may still be configured to display content while sunroof panel 604-1 is in the open position.

With sunroof panel 604-1 in the open positon, an opening 606 through the vehicle roof has been created. Air can flow through the vehicle cabin via the opening 606, and light can pass through the opening 606 as well.

To close the sunroof panel 604-1, the steps shown in FIGS. 6A-6C may be reversed. For example, the sunroof panel 604-1 may move back to its closed position, shown in FIG. 6A, in response to user inputs and/or instruction from moodroof media application 230.

It should be appreciated that the sunroof panels 604 may be arranged in any technically feasible manner, and the moodroof displays 602 may be integrated with the sunroof panels 604 in any technically feasible manner. For example, the moodroof displays 602 may be manufactured to have a thickness that avoids contact with the sunroof glass 604-2 and the headliner 600 when in the open or closed positions. Further, the sunroof actuation system 214 may be implemented in any technically feasible manner. For example, the sunroof actuation system 214 may have tracks and motors configured to move sunroof panel 604-1 as shown in FIGS. 6A-6C. Furthermore, while FIGS. 6A-6C shows a fixed sunroof 604-2, sunroof 604-2 may be configured to be moveable in any technically feasible manner in order to move between open and closed positions.

Figure 7A:
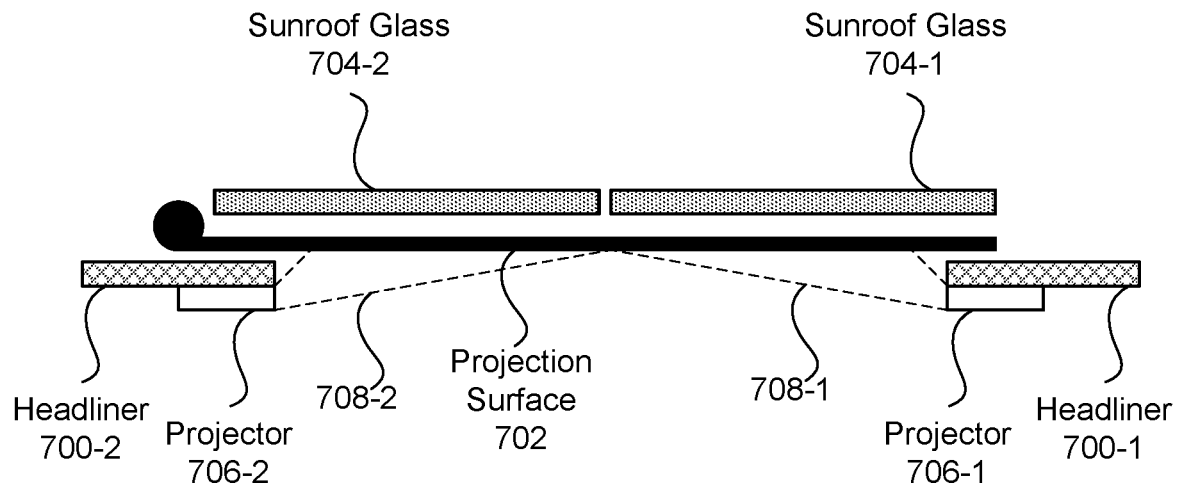
FIGS. 7A-7E are diagrams illustrating the operation of a moodroof projection surface, according to one or more aspects of the various embodiments.

FIGS. 7A-7E are diagrams illustrating operation of an example moodroof projection surface 702, according to one or more aspects of the various embodiments. As shown, FIG. 7A illustrates a moodroof projection surface 702, sunroof glass panels 704, a headliner 700 of a vehicle 100 (e.g., the ceiling of the vehicle cabin 103), and one or more projectors 706 mounted on the headliner 700. The projection surface 702 may be separate from the sunroof panels 704 and may be extended and retracted below the sunroof panels 704. For example, the projection surface 702 may be a flexible surface that can be rolled (retracted) and unrolled (extended) horizontally, similar to how a roll-up projector screen can be retracted and extended vertically. Additionally or alternatively, a lower surface of the sunroof panels 704 facing the interior of the vehicle cabin may be implemented as the projection surface 702. In FIGS. 7A-7E, the roll base of the projector surface 702 and the projection surface 702 may extend from the fixed roll base. Additionally, sunroof panel 704-2 may be fixed, sunroof panel 704-1 may be movable.

Accordingly, FIGS. 7A-7E illustrate an example implementation of moodroof displays 110 in which the moodroof displays 110 are implemented as a projection surface onto which visual content 244 may be projected.

As shown in FIG. 7A, projection surface 702 and sunroof panel 704-1 are in respective closed positions. The projection surface 702 is extended, obscuring the sunroofs 704. Sunroof panel 704-1 is horizontally adjacent to sunroof panel 704-2. While the projection surface 702 is in the closed position, projectors 706 are configured to project content (e.g., visual content 244) onto projection surface 702. For example, projector 706-1 projects a projection 708-1 of content onto a first portion of the projection surface 702, and projector 706-2 projects a projection 708-2 of content onto a second portion of the projection surface 702. In various embodiments, the projection surface 702 is opaque—preventing light from passing through the projection surface 702. In various other embodiments, the projection surface 702 is translucent or semi-transparent.

Figure 7B:
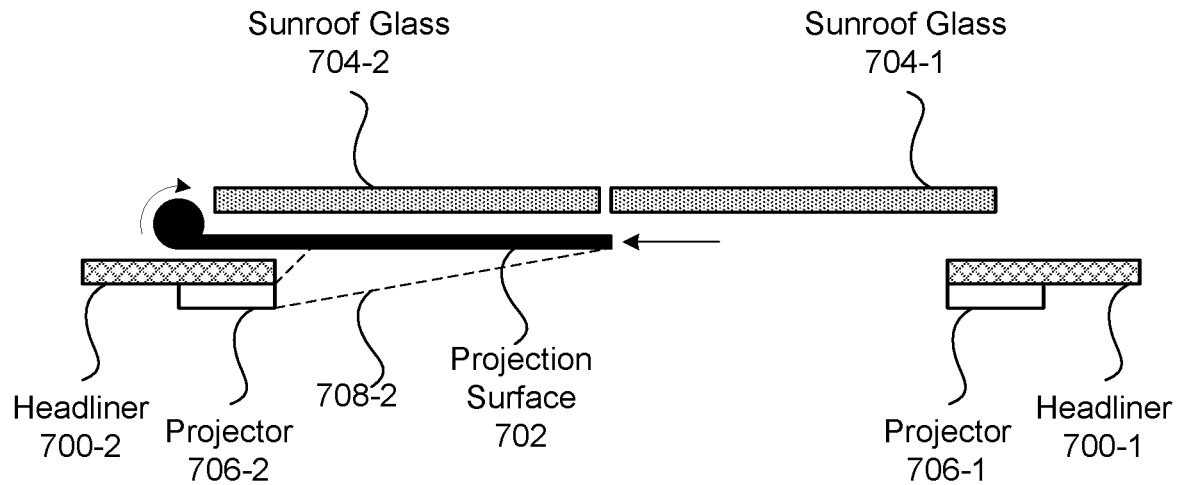

FIG. 7B shows the projection surface 702 in a partially open position, revealing sunroof panel 704-1 but still obscuring sunroof panel 704-2. For example, an occupant may activate a moodroof opening option via user input devices 208 and/or other moodroof opening/closing controls. In response, the head unit 102 sends signals to moodroof actuation system 216 to retract the projection surface 702 towards at least a partially open position. The moodroof actuation system 216 rolls up the projection surface 702 at the fixed roll base, retracting the projection surface 702.

While the projection surface 702 is being retracted towards the partially open position, projector 706-1 may be configured to cease projecting content onto the projection surface 702. For example, the gating engine 420, in response to retraction of the projection surface 702, could determine that the projection surface 702 is being retracted and, in response, the projector 706-1 could cease projecting content. In such embodiments, the gating engine 420 may power down the projector 706-1 and/or fade out the projection 708-1.

Figure 7C:
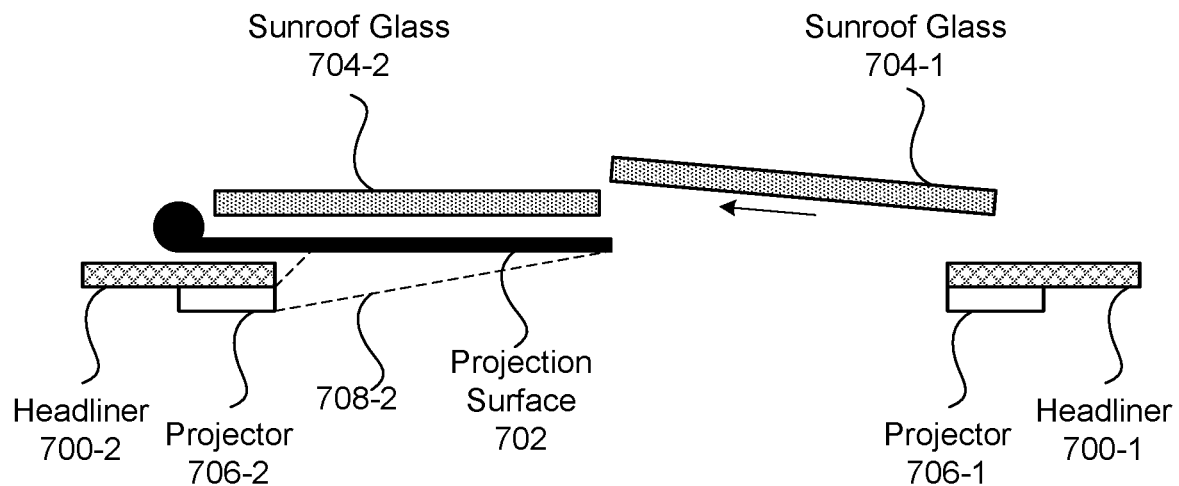

As shown in FIG. 7B, sunroof panel 704-1 is still in the closed position. While sunroof panel 704-1 is in the closed position, light from outside of the vehicle may pass through the sunroof panel 704-1, but air from outside of the vehicle is restricted from entering into the vehicle via the vehicle cabin ceiling. Vehicle occupants may activate a sunroof opening option (e.g., via user input devices 208 and/or other sunroof opening/closing controls) to open the sunroof panel 704-1. In response, the head unit 102 sends signals to sunroof actuation system 214 to move sunroof panel 704-1 to an open position. The sunroof actuation system 214 initiates movement of the sunroof panel 704-1 by angling the sunroof panel 704-1 at an angle that is directed towards a space above sunroof panel 704-2, as shown in FIG. 7C, and moves the sunroof panel 704-1 towards an open position in that space.

Figure 7D:
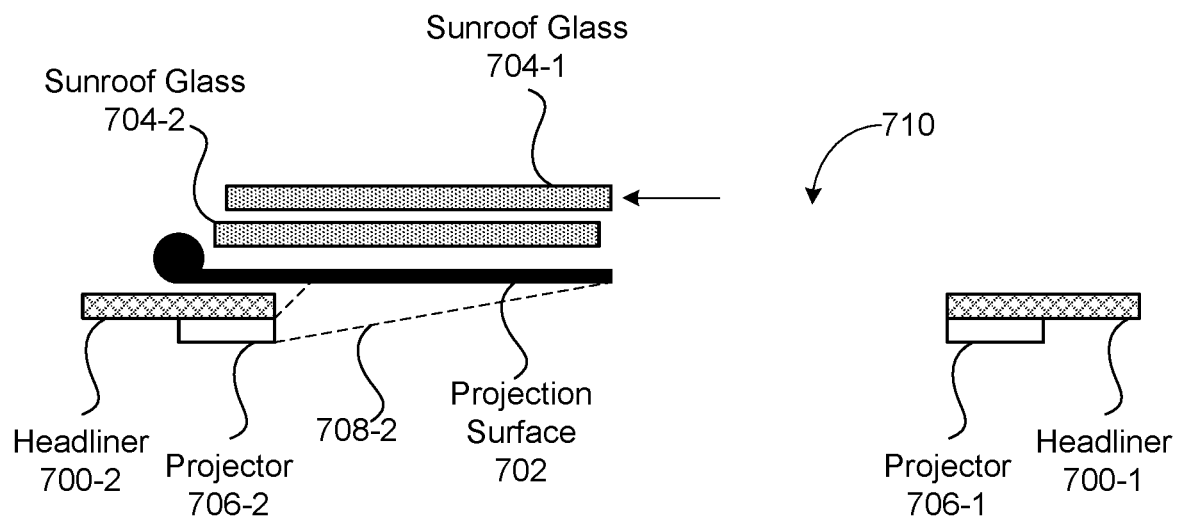

As shown in FIG. 7D, the sunroof panel 704-1 has completed movement to the open position above sunroof panel 704-2. With projection surface 702 in the partially open position and sunroof panel 704-1 in the open position, an opening 710 through the vehicle roof has been created. Air can flow through the vehicle cabin via the opening 710, and light can completely pass through the opening 710 as well.

Figure 7E:
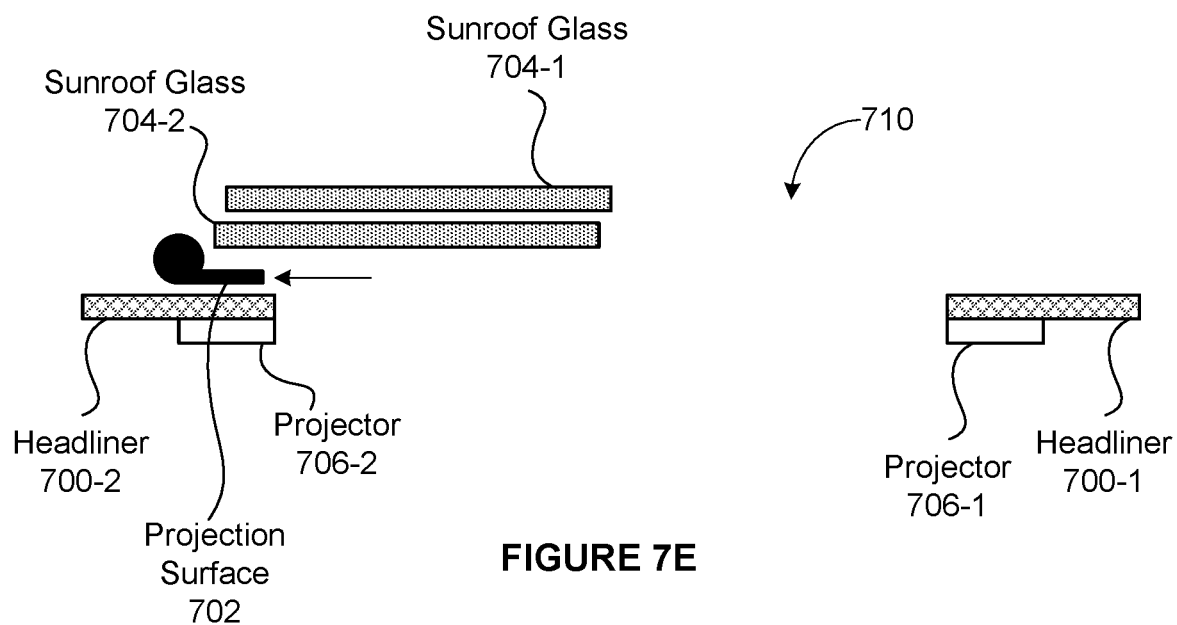

The projection surface 702 may further be fully retracted to a fully open position from the closed position or the partially open position. For example, FIG. 7E illustrates the projection surface 702 retracted to the fully open position. The moodroof actuation system 216 may fully retract the projection surface 702 in response to signals from the head unit 102, which in turn transmits the signals in response to user inputs and/or instructions from the moodroof media application 230. The projection surface 702 may be fully retracted while sunroof panel 704-1 is in the open or closed position. When the projection surface 702 is fully retracted, the sunroof panel 704-2 is exposed to the vehicle cabin, and light can pass through the sunroof panel 704-2 into the vehicle cabin. Furthermore, when the projection surface 702 is fully retracted, both projectors 706-1 and 706-2 are configured to cease projecting content.

To close the sunroof panel 704-1 and/or projection surface 702, the steps shown in FIGS. 7A-7E may be reversed. For example, the sunroof panel 704-1 may move back to its closed position, shown in FIGS. 7A-7B, in response to user inputs and/or instruction from the moodroof media application 230. The projection surface 702 may be extended, from the fully or partially open position, into the closed position, shown in FIG. 7A, in response to user inputs and/or instruction from the moodroof media application 230.

It should be appreciated that the projection surface 702 and sunroof panels 704 may be arranged in any technically feasible manner. For example, the projection surface 702 may be manufactured to have a thickness that fits into a space between sunroof panels 704 and the headliner 700. As another example, the projection surface 702 may be implemented as one or more panels that can be moved between an open and a closed position, instead of a rollable, flexible surface. As a further example, the projection surface 702 may be implemented as two or more rollable, flexible surfaces. Further, the moodroof actuation system 216 and sunroof actuation system 214 may be implemented in any technically feasible manner. For example, the moodroof actuation system 216 may have motors configured to retract and extend the projection surface 702, and tracks configured guide the retraction and extension of the projection surface 702. Furthermore, while FIGS. 7A-7E shows a fixed sunroof 704-2, sunroof 704-2 may be configured to be moveable in any technically feasible manner in order to move between open and closed positions.

Figure 8:
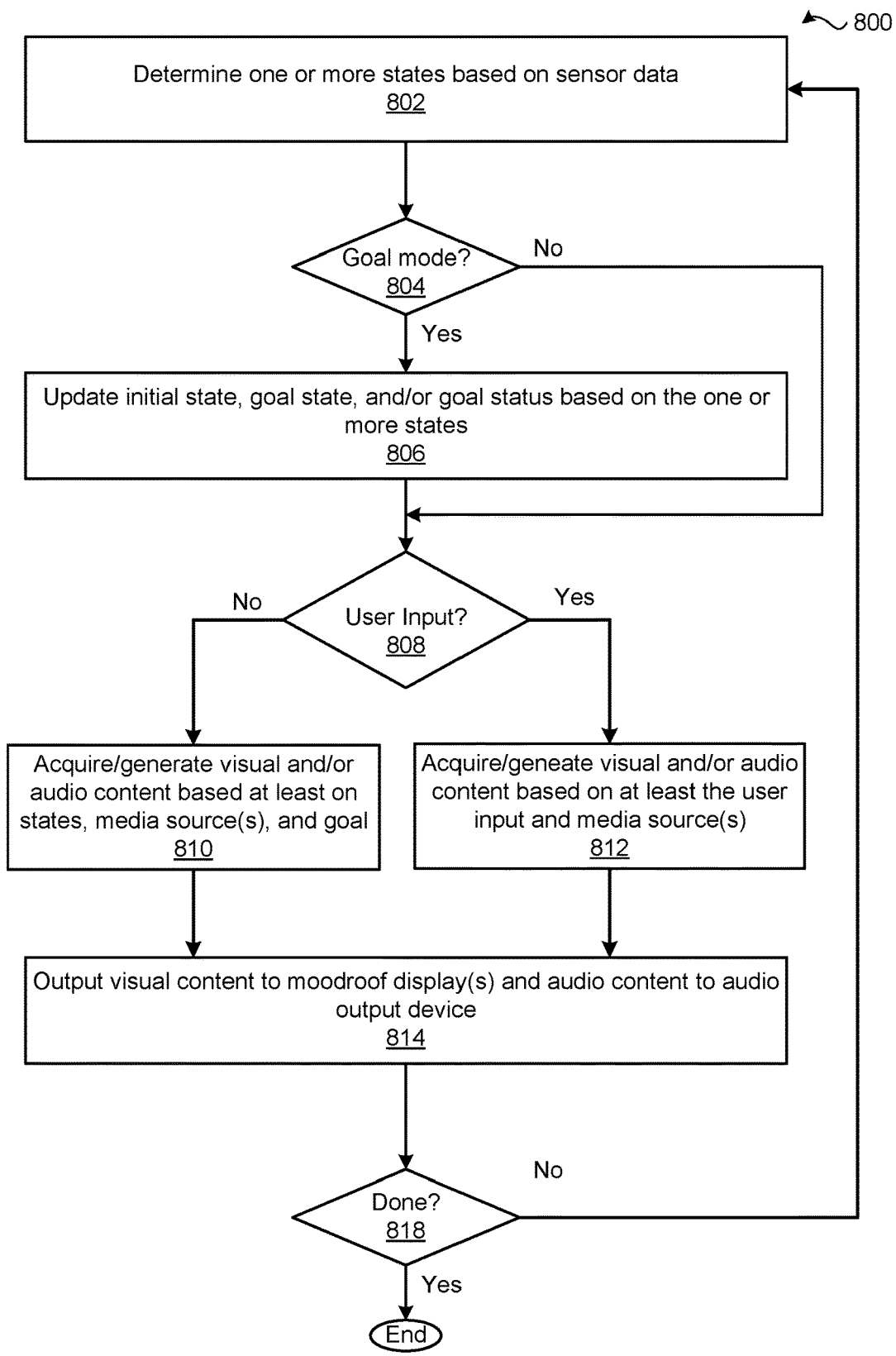
FIG. 8 sets forth a flowchart of method steps for displaying media content on a moodroof display system, according to one or more aspects of the various embodiments.

FIG. 8 sets forth a flowchart of method steps for displaying media content on a moodroof display system, according to one or more aspects of the various embodiments. Although the method steps are described in conjunction with the systems of FIGS. 1A-7E, persons skilled in the art will understand that any system configured to perform the method steps, in any order, falls within the scope of the various embodiments.

As shown in FIG. 8, a method 800 begins at step 802, where a moodroof media application 230 determines one or more states based on sensor data. For example, moodroof media application 230 may determine one or more vehicle states 402, environmental states 404, and occupant emotional states 406 based on sensor data 330 from sensors 220.

At step 804, if the moodroof media application 230 is not operating in a goal mode (804—No), then the method proceeds to step 808. If the moodroof media application is operating in a goal mode (804—Yes), then the method 800 proceeds to step 806.

At step 806, the moodroof media application 230 updates an initial state, a goal state, and/or a goal status based on the one or more states. For example, the goal engine 410 may determine an initial state 414, a goal state 412, and/or a goal status 416 based on the one or more vehicle states 402, environmental states 404, and occupant emotional states 406. To give a particular example, the goal status 416 may determine that the initial state 414 is a gloomy mood, determine a goal state 412 of a happy mood, and determine the current status 416 toward the goal state 412.

At step 808, if one or more user inputs instructing certain content for the moodroof display system has not been received (808—No), then the method 800 proceeds to step 810. If one or more user inputs (e.g., user inputs 470) instructing certain content for the moodroof display system has been received (808—Yes), then the method 800 proceeds to step 812.

At step 810, the moodroof media application 230 acquires and/or generates visual media content and/or audio media content based on at least the one or more states, media sources, and optionally a goal state. For example, the media acquisition and generation engine 450 may acquire visual content 244, and optionally audio content 242, from media sources 250. The media acquisition and generation engine 450 may also generate visual content 244 and optionally audio content 242. The media acquisition and generation engine 450 may further combine acquired visual content and generated visual content (e.g., acquire camera images of the exterior environment and generate augmented reality overlays for the camera images). The acquired and/or generated visual content 244 may be selected and determined based on one or more of the vehicle states 402, environmental states 404, and occupant emotional states 406, and optionally a goal state 412, an initial state 414, and a goal status 416.

At step 812, the moodroof media application 230 acquires and/or generates visual media content and/or audio media content based on at least the user inputs and the media sources. For example, the media acquisition and generation engine 450 may acquire visual content 244, and optionally audio content 242, from media sources 250 in accordance with user inputs 470 that select the content and specify the media source. The media acquisition and generation engine 450 may also generate visual content 244, and optionally audio content 242, in accordance with the user inputs 470. In some embodiments, the acquired and/or generated visual content is associated with the audio content (e.g., visualization graphics generated for a piece of music, an image of an ocean view accompanying an ocean soundtrack, etc.). The media acquisition and generation engine 450 may further combine acquired visual content and generated visual content (e.g., acquire camera images of the exterior environment and generate augmented reality overlays for the camera images). In various embodiments, the acquisition and/or generation may be based on the one or more states as well as the user inputs 470. In some embodiments, the user inputs 470 specify a goal state 412 instead of selecting specific content. In these embodiments, the goal engine 410 sets the goal state 412 to the specified goal state, and the media acquisition and generation engine 450 acquires and/or generates content 244 and 242 to progress toward the goal state 412.

At step 814, the moodroof media application 230 outputs the visual content 244 to one or more moodroof displays 110 and outputs audio content 242 to an audio output device 212. The moodroof media application 230 transmits, via the head unit 120, visual content 244 to moodroof displays 110 (e.g., displays 502 or 602) or projectors 708 for display or projection. The moodroof media application 230 transmits, via the head unit 120, audio content 242 to audio output device 212 (e.g., speakers) for output.

At step 818, if the moodroof media application 230 determines that the moodroof media application 230 is to cease executing (818—Yes), then the method 800 ends. If the moodroof media application 230 determines that the moodroof media application 230 is to continue executing (818—No), then the method 800 returns to step 802, where the moodroof media application 230 may determine updated states.

Figure 9:
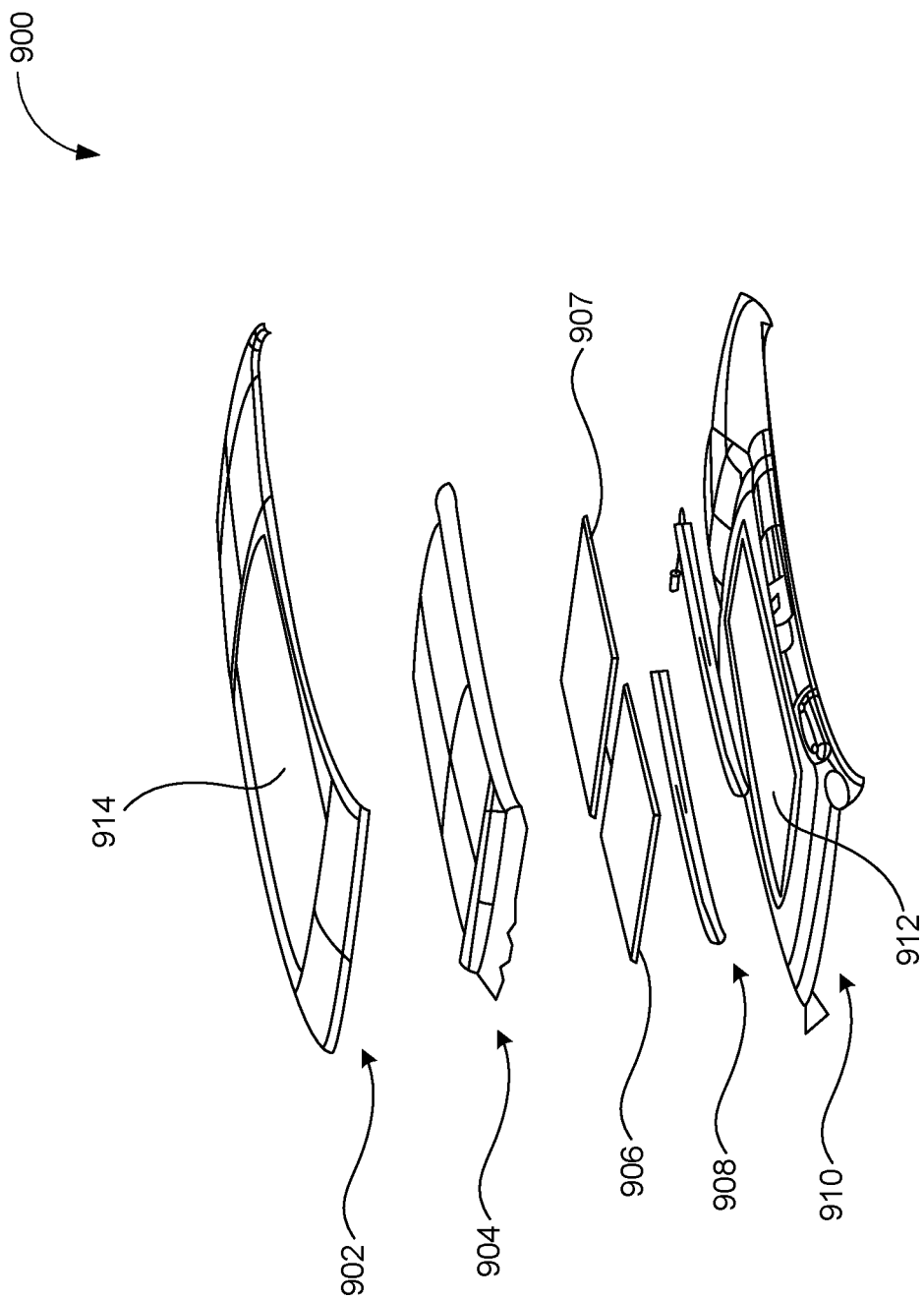
FIG. 9 illustrates an exploded view of an implementation of the moodroof displays of FIGS. 5A-5E, according to one or more aspects of the various embodiments.

FIG. 9 illustrates an exploded view of an implementation 900 of the example moodroof displays of FIGS. 5A-5E, according to one or more aspects of the various embodiments. FIG. 9 illustrates components in an implementation 900 of the moodroof displays 502 and sunroof panels 504. FIG. 9 shows the exploded view of the implementation 900 from a top-down angled perspective.

The implementation 900 includes a roof sheet metal 902 and a headliner 910. The roof sheet metal 902 forms the upper surface of the vehicle roof 102, and the headliner 910 forms the interior surface of the vehicle roof 102. The roof sheet metal 902 includes an opening 914, and the headliner 910 includes an opening 912. A track and motor system 908 (e.g., moodroof actuation system 216) may be mounted onto the headliner 902 along the sides of the opening 912 in the headliner 902. A front, moving display 906 (e.g., moodroof display 502-1) may be positioned above the opening 912 in the headliner 910 and mounted on the tracks of the track and motor system 908. A rear, fixed display 907 (e.g., moodroof display 502-2) may also positioned above the opening 912 in the headliner 910 and mounted in a fixed manner onto the tracks of the tracks of the track and motor system 908. A glass sunroof assembly 904 (e.g., sunroof panels 504 and sunroof actuation system 214) is positioned below the opening 914 in the roof sheet metal 902 and mounted to the roof sheet metal 902.

Figure 10:
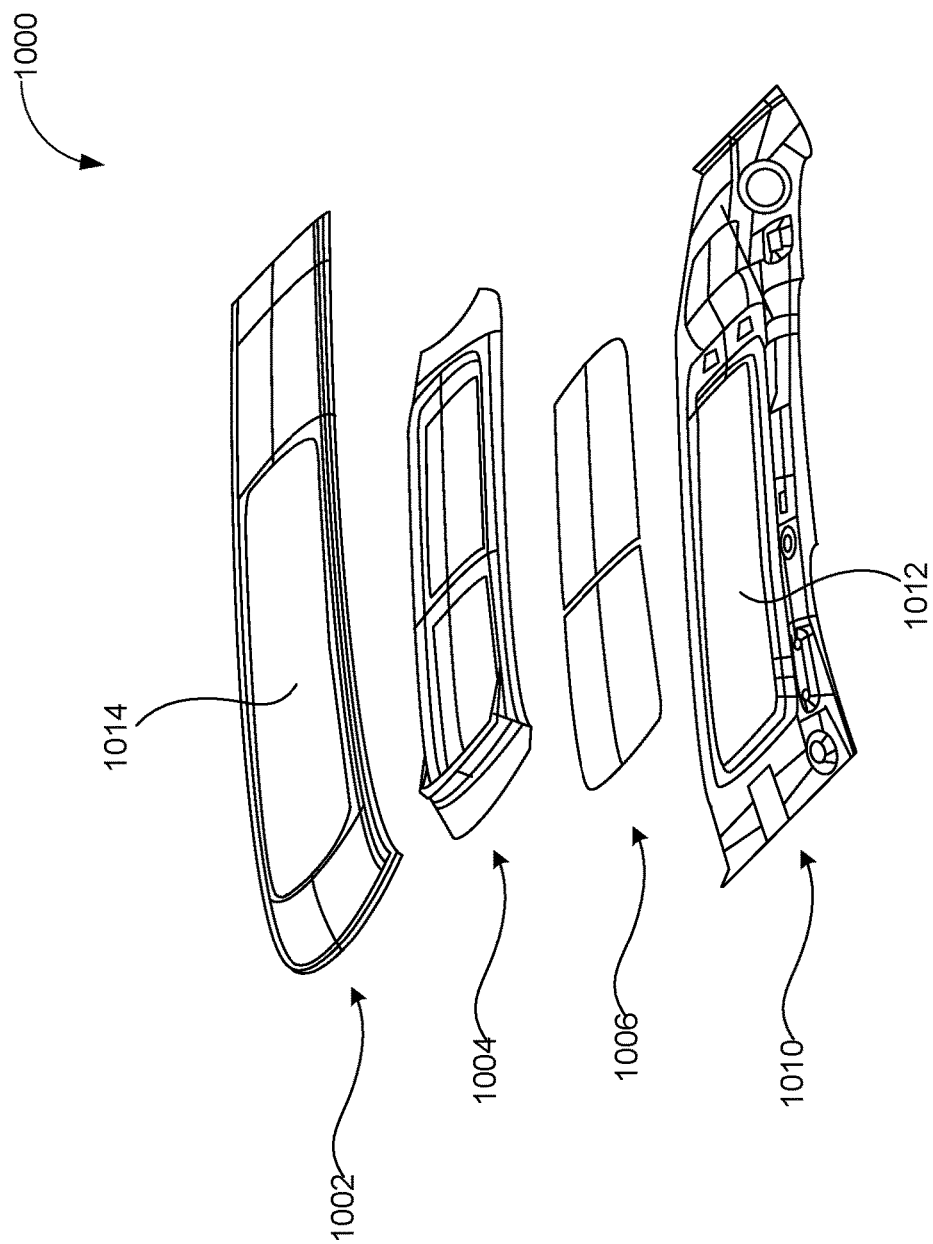
FIG. 10 illustrates an exploded view of an implementation of the further example moodroof displays of FIGS. 6A-6C, according to one or more aspects of the various embodiments.

FIG. 10 illustrates an exploded view of an implementation 1000 of the further example moodroof displays of FIGS. 6A-6C, according to one or more aspects of the various embodiments. FIG. 10 illustrates components in an implementation 1000 of the moodroof displays 602 and sunroof panels 604. FIG. 10 shows the exploded view of the implementation 1000 from a top-down angled perspective.

The implementation 1000 includes a roof sheet metal 1002 and a headliner 1010. The roof sheet metal 1002 forms the upper surface of the vehicle roof 102, and the headliner 1010 forms the interior surface of the vehicle roof 102. The roof sheet metal 1002 includes an opening 1014, and the headliner 1010 includes an opening 1012. Front and rear displays 1006 (e.g., moodroof displays 602) are fixed to the sunroof glass panels (e.g., sunroof panels 604) of a glass sunroof assembly 1004. In some embodiments, the displays 1006 are transparent OLED displays. The glass sunroof assembly 1004 (e.g., sunroof panels 604 and sunroof actuation system 214) is positioned below the opening 1014 in the roof sheet metal 1002 and above the opening 1012 in headliner 1010. The glass sunroof assembly 1004 may be mounted to the headliner 1010 and/or the roof sheet metal 1002.

Figure 11:
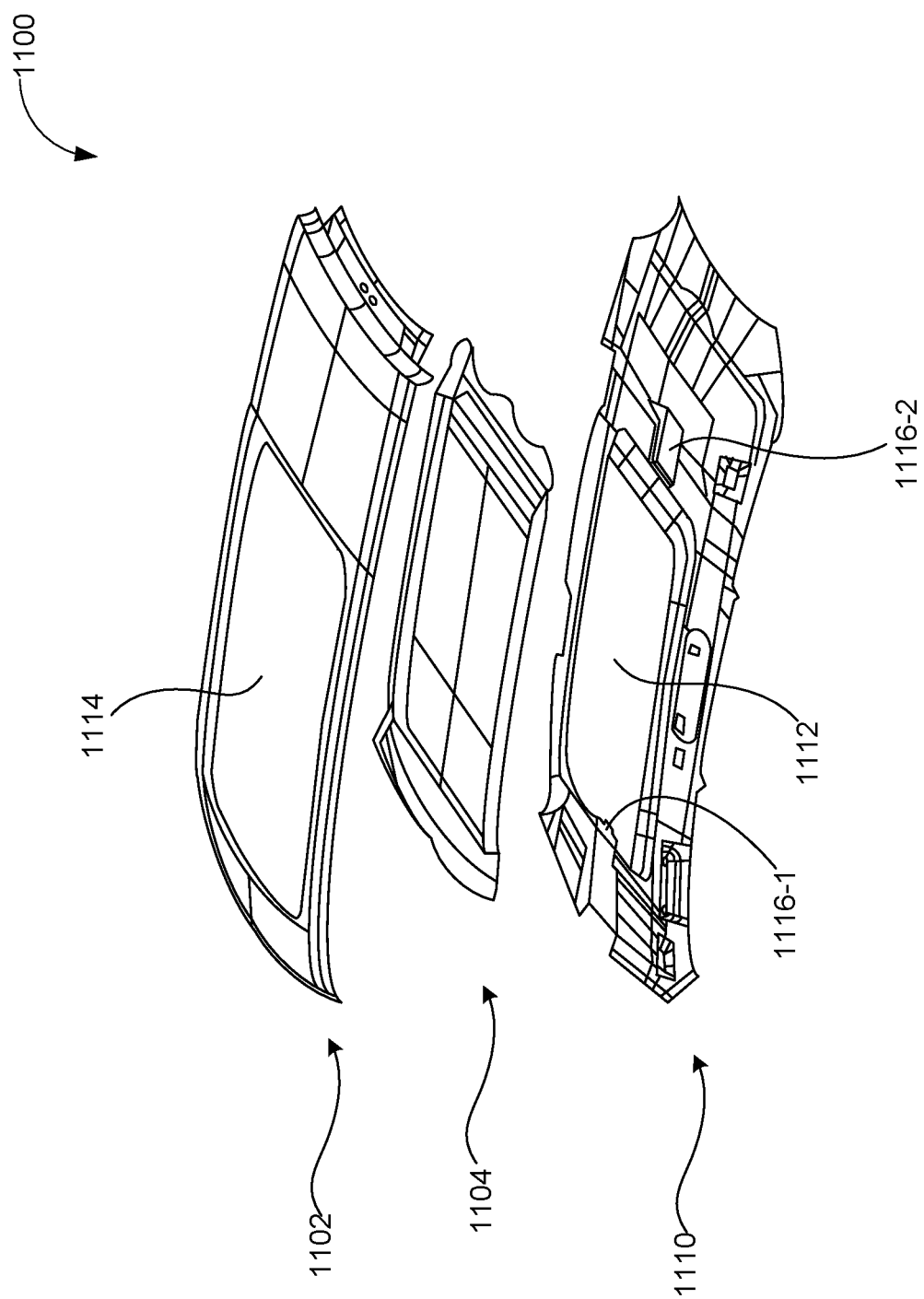
FIG. 11 illustrates an exploded view of an implementation of the moodroof projection surface of FIGS. 7A-7E, according to one or more aspects of the various embodiments.

FIG. 11 illustrates an exploded view of an implementation 1100 of the example moodroof projection surface of FIGS. 7A-7E, according to one or more aspects of the various embodiments. FIG. 11 illustrates components in an implementation 1100 of the projection surface 702 and sunroof panels 704. FIG. 11 shows the exploded view of the implementation 1200 from a bottom-up angled perspective.

The implementation 1100 includes a roof sheet metal 1102 and a headliner 1110. The roof sheet metal 1102 forms the upper surface of the vehicle roof 102, and the headliner 1110 forms the interior surface of the vehicle roof 102. The roof sheet metal 1102 includes an opening 1114, and the headliner 1110 includes an opening 1112. Projectors 1116-1 and 1116-2 may be mounted onto the headliner 1110 along sides of the opening 1112. A glass sunroof assembly 1104 (e.g., sunroof panels 604, sunroof actuation system 214) is positioned below the opening 1114 in the roof sheet metal 1102 and above the opening 1112 in headliner 1110. The glass sunroof assembly 1104 may be mounted to the headliner 1110 and/or the roof sheet metal 1102. The glass sunroof assembly 1104 further includes a retractable projection surface (e.g., projection surface 702) and associated tracks and motor (e.g., moodroof actuation system 216) for retracting and extending the projection surface 702.

In sum, a vehicle includes a moodroof display system positioned in an upper portion (e.g., a ceiling or roof) of a vehicle cabin of the vehicle in lieu of, or in addition to, a sunroof (also referred to as a "moonroof"). A moodroof media application may obtain sensor data from one or more sensors, which may include vehicle sensors, image sensors, environmental sensors, and biometric sensors. The moodroof media application then acquires media content (e.g., images, video) based on the sensor data. For example, the vehicle may determine one or more states and/or characteristics based on the sensor data, and acquire media content based on the one or more states and/or characteristics. Examples of the states and/or characteristics that may be determined from sensor data include a state of the vehicle, a characteristic of the vehicle cabin, a state of an environment outside of the vehicle, and a characteristic of the occupant(s). The moodroof media application causes visual content associated with the media content, which may be at least a component of the media content itself if the media content includes visual content, to be displayed on the moodroof display system on the upper portion of the vehicle cabin. In some embodiments, the moodroof display system includes at least two displays, where at least one display is retractable to expose the vehicle cabin to the outside environment of the vehicle. Additionally or alternatively, the moodroof display system may include a projection system having a retractable projection surface.

At least one advantage and technological improvement of the disclosed techniques is that the ceiling of a vehicle cabin may be used as a display space for displaying media content to occupants in the vehicle cabin, while still allowing the ceiling to be opened in order to let natural light and air flow into the vehicle cabin. Another advantage and technological improvement is that the disclosed techniques enable immersive media experiences that further enhance the experience of the vehicle occupants. A further advantage and technological improvement is that, because the media content may be acquired based on the emotional state(s) of the occupant(s), the overall experience of the occupant(s) may be improved.

1. In some embodiments, a computer-implemented method for presenting media content within a vehicle cabin comprises determining at least one state associated with the vehicle cabin based on sensor data from at least one sensor; receiving media content associated with the at least one state; and causing visual content associated with the media content to be displayed on at least one display surface positioned on a ceiling of the vehicle cabin.

2. The method of clause 1, wherein the at least one display surface is disposed vertically below a sunroof of the vehicle cabin.

3. The method of clauses 1 or 2, wherein the at least one sensor comprises at least one of a vehicle sensor, an environmental sensor, and a biometric sensor.

4. The method of any of clauses 1-3, wherein the at least one state comprises at least one of a vehicle state, an environmental state, and an emotional state of an occupant of the vehicle cabin.
5. The method of any of clauses 1-4, wherein the at least one display surface comprises a first display device and a second display device, wherein the first display device is adjacent the second display surface, and both the first display surface and the second display device display the visual content towards an interior of the vehicle cabin.
6. The method of any of clauses 1-5, wherein the visual content comprises visual content received from a device associated with an occupant of the vehicle cabin, and the device is communicatively coupled to an infotainment system of the vehicle cabin.
7. The method of any of clauses 1-6, wherein the at least one display surface runs parallel to the ceiling of the vehicle cabin.
8. In some embodiments, a system for displaying media content in a vehicle cabin comprises a first display surface positioned on a ceiling of the vehicle cabin; a second display surface positioned on the ceiling of the vehicle cabin, wherein the first display surface is movable relative to the second display surface; a memory storing a media application; and a processor coupled to the memory, wherein the processor, when executing the media application, causes the first display surface and the second display surface to display media content in the vehicle cabin.
9. The system of clause 8, wherein causing the first display surface and the second display surface to display media content comprises transmitting the media content to one or more projectors, wherein the one or more projectors project the media content onto the first display surface and the second display surface.
10. The system of clauses 8 or 9, wherein the first display surface is at least partially transparent.
11. The system of any of clauses 8-10, wherein, when the first display surface is in a closed position, the first display surface is horizontally adjacent to the second display surface.
12. The system of any of clauses 8-11, wherein, when the first display surface is in an open position, the first display surface is positioned vertically above the second display surface.
13. The system of any of clauses 8-12, wherein, when executed by the processor, the media application further causes the processor to cause the first display surface to cease displaying media content when the first display surface is in an open position.
14. The system of any of clauses 8-13, wherein the first display surface is disposed vertically below a sunroof panel, wherein, when both the first display surface and the sunroof panel are in open positions, a sunroof of the vehicle cabin is open to an external environment.
15. In some embodiments, one or more non-transitory computer-readable storage media include instructions that, when executed by a processor, cause the processor to present media content by performing the steps of determining a first emotional state associated with at least one occupant within a vehicle cabin; receiving media content associated with the first emotional state; and causing visual content associated with the media content to be displayed on at least one display surface positioned on a ceiling of the vehicle cabin.
16. The one or more computer-readable storage media of clause 15, wherein the visual content comprises at least one of still images and video associated with the first emotional state.
17. The one or more computer-readable storage media of clauses 15 or 16, wherein receiving the media content associated with the first emotional state comprises determining a goal emotional state based on the first emotional state; and acquiring the media content based on the goal emotional state.
18. The one or more computer-readable storage media of any of clauses 15-17, wherein receiving the media content associated with the first emotional state comprises receiving a user input associated with a goal emotional state; and selecting the media content based on the goal emotional state.
19. The one or more computer-readable storage media of any of clauses 15-18, wherein the at least one display surface comprises a first display surface and a second display surface, wherein the first display surface is moveable relative to a second display surface positioned on the ceiling of the vehicle cabin.
20. The one or more computer-readable storage media of any of clauses 15-19, further comprising determining at least one of a vehicle state and an environmental state, and wherein receiving the media content associated with the first emotional state comprises acquiring the media content that is further based on the at least one of the vehicle state and the environmental state.

Any and all combinations of any of the claim elements recited in any of the claims and/or any elements described in this application, in any fashion, fall within the contemplated scope of the present protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RANI), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system for displaying media content in a vehicle cabin, comprising:
   a first display surface positioned on a ceiling of the vehicle cabin;
   a second display surface positioned on the ceiling of the vehicle cabin, wherein the first display surface is movable relative to the second display surface between:
      a closed position between a first glass panel in the ceiling of the vehicle cabin and an interior of the vehicle cabin, and
      an open position between a second glass panel in the ceiling of the vehicle cabin and the second display surface;
   a memory storing a media application; and
   a processor coupled to the memory, wherein the processor, when executing the media application performs the steps of:
      deploying the first display surface from the open position to the closed position; and
      displaying media content in the vehicle cabin using the first display surface and the second display surface.

2. The system of claim 1, further comprising:
   one or more projectors;
   wherein the step of displaying the media content using the first display surface and the second display surface comprises projecting the media content onto the first display surface and the second display surface using the one or more projectors.

3. The system of claim 1, wherein the first display surface is at least partially transparent.

4. The system of claim 1, wherein when the first display surface is in the closed position, the first display surface is horizontally adjacent to the second display surface.

5. The system of claim 1, wherein the steps further comprise ceasing the displaying of the media content on the first display surface when the first display surface is in the open position.

6. The system of claim 1, wherein the first display surface is integrated with the first glass panel and moves with the first glass panel.

7. The system of claim 1, wherein the steps further comprise:
   determining an initial state associated with the vehicle cabin based on sensor data from at least one sensor; and
   selecting the media content based on the initial state associated with the vehicle cabin.

8. The system of claim 1, wherein the step of selecting the media content comprises selecting the media content further based on a goal state associated with the vehicle cabin.

9. A computer-implemented method for presenting media content within a vehicle cabin, the method comprising:
   deploying a first display surface from an open position to a closed position; and
   displaying media content on the first display surface and a second display surface;
   wherein the first display surface is movable relative to the second display surface between:
      the closed position between a first glass panel in a ceiling of the vehicle cabin and an interior of the vehicle cabin, and
      the open position between a second glass panel in the ceiling and the second display surface.

10. The method of claim 9, wherein displaying the media content on the first display surface and the second display surface comprises projecting the media content onto the first display surface and the second display surface using one or more projectors.

11. The method of claim 9, further comprising:
   determining a state associated with the vehicle cabin based on sensor data from at least one sensor; and
   selecting the media content based on the state associated with the vehicle cabin.

12. The method of claim 9, wherein when the first display surface is in the closed position, the first display surface is horizontally adjacent to the second display surface.

13. The method of claim 9, further comprising ceasing the displaying of the media content on the first display surface when the first display surface is in the open position.

14. The method of claim 9, wherein selecting the media content comprises selecting the media content further based on a goal state associated with the vehicle cabin.

15. One or more non-transitory computer-readable storage media storing instructions that, when executed by a processor, cause the processor to perform the steps of:

deploying a first display surface from an open position to a closed position; and displaying media content on the first display surface and a second display surface;

wherein the first display surface is movable relative to the second display surface between:

the closed position between an interior of a vehicle and a first glass panel in a ceiling of a vehicle cabin, and the open position between a second glass panel in the ceiling and the second display surface.

16. The one or more non-transitory computer-readable storage media of claim 15, wherein the step of displaying the media content on the first display surface and the second display surface comprises projecting the media content onto the first display surface and the second display surface using one or more projectors.

17. The one or more non-transitory computer-readable storage media of claim 15, wherein the steps further comprise:

determining an initial state associated with the vehicle cabin based on sensor data from at least one sensor; and selecting the media content based on the initial state associated with the vehicle cabin.

18. The one or more non-transitory computer-readable storage media of claim 15, wherein when the first display surface is in the closed position, the first display surface is horizontally adjacent to the second display surface.

19. The one or more non-transitory computer-readable storage media of claim 15, wherein the steps further comprise ceasing the displaying of the media content on the first display surface when the first display surface is in the open position.

20. The one or more non-transitory computer-readable storage media of claim 15, wherein the step of selecting the media content comprises selecting the media content further based on a goal state associated with the vehicle cabin.

* * * * *